US012671617B2

(12) United States Patent
Cheng et al.

(10) Patent No.: US 12,671,617 B2
(45) Date of Patent: Jun. 30, 2026

(54) LOW COMPLEXITY INTERCARRIER INTERFERENCE (ICI) COMPENSATION ALGORITHM: CYCLIC BLOCK PHASE TRACKING REFERENCE SIGNAL (PTRS) SEQUENCE DESIGN

(71) Applicant: Telefonaktiebolaget LM Ericsson (publ), Stockholm (SE)

(72) Inventors: Jung-Fu Cheng, Fremont, CA (US); Mehrnaz Afshang, Fremont, CA (US); Stephen Grant, Pleasanton, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 282 days.

(21) Appl. No.: 18/551,299

(22) PCT Filed: Mar. 31, 2022

(86) PCT No.: PCT/SE2022/050320
§ 371 (c)(1),
(2) Date: Sep. 19, 2023

(87) PCT Pub. No.: WO2022/211717
PCT Pub. Date: Oct. 6, 2022

(65) Prior Publication Data
US 2024/0179040 A1 May 30, 2024

Related U.S. Application Data

(60) Provisional application No. 63/168,694, filed on Mar. 31, 2021.

(51) Int. Cl.
H04L 27/26 (2006.01)
H04L 5/00 (2006.01)
H04L 25/03 (2006.01)

(52) U.S. Cl.
CPC ........ H04L 27/2613 (2013.01); H04L 5/0007 (2013.01); H04L 25/03821 (2013.01); H04L 27/2607 (2013.01)

(58) Field of Classification Search
None
See application file for complete search history.

(56) References Cited

U.S. PATENT DOCUMENTS

2008/0304585 A1* 12/2008 Song ................. H04L 25/03821
375/346
2010/0220822 A1* 9/2010 Wernaers .......... H04L 25/03133
375/346

(Continued)

FOREIGN PATENT DOCUMENTS

EP 3644540 A1 4/2020
WO 2020186179 A1 9/2020

OTHER PUBLICATIONS

International Search Report and Written Opinion dated Sep. 13, 2022 for International Application No. PCT/SE2022/050320 filed Mar. 31, 2022; consisting of 14 pages.

(Continued)

*Primary Examiner* — Otis L Thompson, Jr.
(74) *Attorney, Agent, or Firm* — Weisberg I.P. Law, P.A.

(57) ABSTRACT

A method, system and apparatus for low complexity inter-carrier interference (ICI) compensation algorithms and cyclic block phase tracking reference signal (PTRS) sequence design are disclosed. According to one aspect, a method in a network node includes generating a PTRS, having a PTRS sequence that is configured to lower a complexity of an ICI compensation algorithm. According to another aspect, a method in a wireless device (WD) includes determining an ICI compensation algorithm based at least in part on a PTRS having a PTRS sequence, and applying the (Continued)

determined ICI compensation algorithm to compensate for ICI.

20 Claims, 13 Drawing Sheets

(56)

References Cited

U.S. PATENT DOCUMENTS

| | | | | |
|---|---|---|---|---|
| 2018/0278394 | A1* | 9/2018 | Wang | H04B 7/0413 |
| 2018/0368013 | A1* | 12/2018 | Yoo | H04L 5/0048 |
| 2019/0044673 | A1* | 2/2019 | Maleki | H04L 5/0051 |
| 2019/0222385 | A1* | 7/2019 | Hessler | H04L 27/2655 |
| 2019/0327042 | A1* | 10/2019 | Maleki | H04L 27/266 |
| 2019/0356515 | A1* | 11/2019 | Murakami | H04L 27/2657 |
| 2020/0127776 | A1* | 4/2020 | Maki | H04L 27/364 |
| 2020/0153585 | A1* | 5/2020 | Wu | H04L 27/2688 |
| 2021/0273755 | A1* | 9/2021 | Shaked | H04L 1/0071 |
| 2022/0060361 | A1* | 2/2022 | Zhang | H04L 5/0007 |
| 2022/0109537 | A1* | 4/2022 | Zewail | H04L 5/0094 |
| 2022/0109539 | A1* | 4/2022 | Zewail | H04L 5/0048 |
| 2022/0109601 | A1* | 4/2022 | Zewail | H04L 27/2662 |
| 2024/0187288 | A1* | 6/2024 | Ali | H04L 5/006 |

OTHER PUBLICATIONS

3GPP TSG-RAN WG1 Meeting #102-e R1-2005922; Title: On Phase Noise Compensation for OFDM; Agenda Item: 8.2.3; Source: Ericsson; Document for: Discussion, Decision; Date and Location: Aug. 17-28, 2020, e-Meeting; consisting of 8 pages.

3GPP TSG RAN WG1 Meeting #104-e R1-2100201; Title: PDSCH/PUSCH enhancements for 52-71 GHz band; Agenda Item: 8.2.5; Source: Huawei, HiSilicon; Document for: Discussion and Decision; Date and Location: Jan. 25-Feb. 5, 2021, E-meeting; consisting of 17 pages.

3GPP TSG RAN WG1 #104-e R1-2100553; Title: PT-RS enhancements for NR from 52.6GHz to 71 GHz; Source: Mitsubishi Electric; Agenda Item: 8.2.5—PDSCH/PUSCH enhancements; Document for: Discussion/Decision; Date and Location: Jan. 25-Feb. 5, 2021, e-meeting; consisting of 12 pages.

* cited by examiner

*OPTIONALLY PRESENT IN UL, NOT PRESENT IN DL*

PTRS EVERY OFDM SYMBOL    PTRS EVERY 2$^{ND}$ OFDM SYMBOL    PTRS EVERY 4$^{th}$ OFDM SYMBOL

PDCCH    DM-RS    PTRS    PDSCH

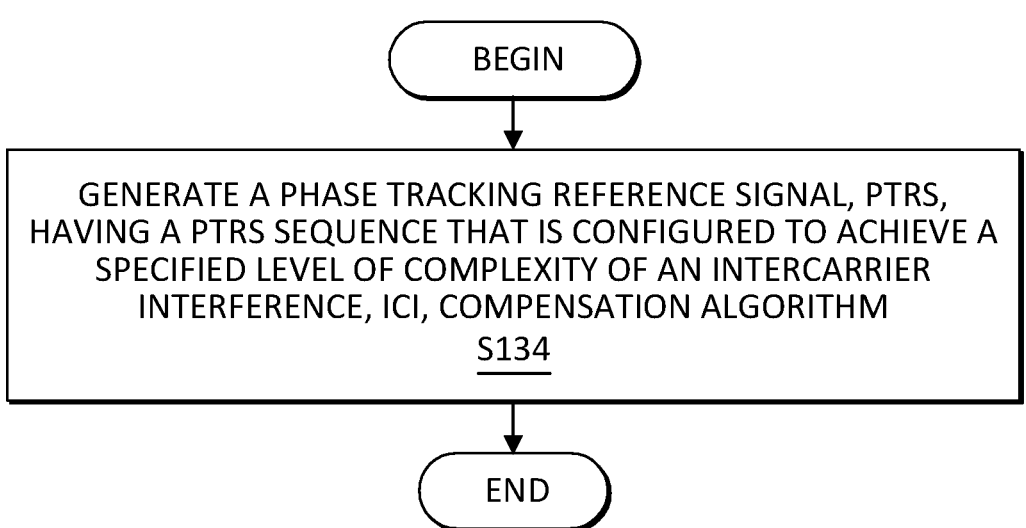

BEGIN

GENERATE A PHASE TRACKING REFERENCE SIGNAL, PTRS, HAVING A PTRS SEQUENCE THAT IS CONFIGURED TO ACHIEVE A SPECIFIED LEVEL OF COMPLEXITY OF AN INTERCARRIER INTERFERENCE, ICI, COMPENSATION ALGORITHM
S134

END

FIG. 11

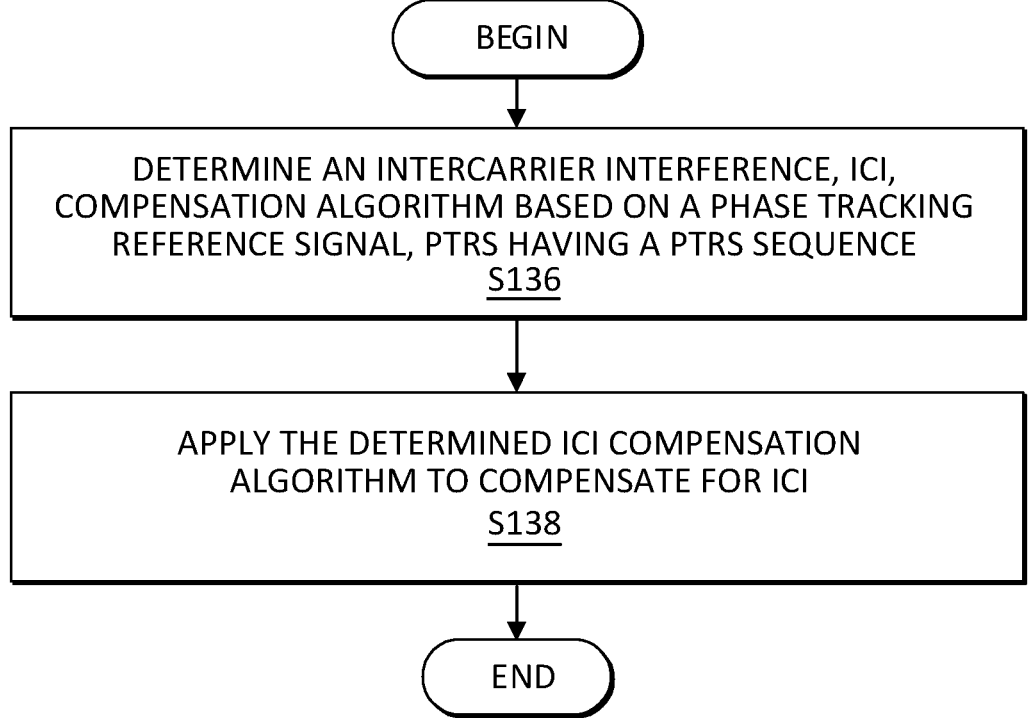

BEGIN

DETERMINE AN INTERCARRIER INTERFERENCE, ICI, COMPENSATION ALGORITHM BASED ON A PHASE TRACKING REFERENCE SIGNAL, PTRS HAVING A PTRS SEQUENCE
S136

APPLY THE DETERMINED ICI COMPENSATION ALGORITHM TO COMPENSATE FOR ICI
S138

END

LOW COMPLEXITY INTERCARRIER INTERFERENCE (ICI) COMPENSATION ALGORITHM: CYCLIC BLOCK PHASE TRACKING REFERENCE SIGNAL (PTRS) SEQUENCE DESIGN

CROSS-REFERENCE TO RELATED APPLICATIONS

This application is a Submission Under 35 U.S.C. § 371 for U.S. National Stage Patent Application of International Application No.: PCT/SE2022/050320, filed Mar. 31, 2022 entitled "LOW COMPLEXITY INTERCARRIER INTERFERENCE (ICI) COMPENSATION ALGORITHM: CYCLIC BLOCK PHASE TRACKING REFERENCE SIGNAL (PTRS) SEQUENCE DESIGN," which claims priority to U.S. Provisional Application No. 63/168,694, filed Mar. 31, 2021, entitled "LOW COMPLEXITY ICI COMPENSATION ALGORITHM: CYCLIC BLOCK PTRS SEQUENCE DESIGN," the entireties of both of which are incorporated herein by reference.

TECHNICAL FIELD

The present disclosure relates to wireless communications, and in particular, to low complexity intercarrier interference (ICI) compensation algorithms and cyclic block phase tracking reference signal (PTRS) sequence design.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

Mobile broadband will continue to drive the demands for big overall traffic capacity and huge achievable end-user data rates in the wireless access network. Several scenarios in the future will require data rates of up to 10 Gbps in local areas. These demands for very high system capacity and very high end-user date rates can be met by networks with distances between access nodes ranging from a few meters in indoor deployments up to roughly 50 meters in outdoor deployments. Future demand thus calls for an infra-structure density considerably higher than the densest networks of today.

In 3GPP Technical Release 15 (3GPP Rel-15), NR was specified to provide services for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

Besides traditional licensed exclusive bands, NR systems are currently being extended expected to operate on unlicensed bands. The NR system specifications currently address two frequency ranges (FR1 and FR2) summarized in Table 1, to support ever growing mobile traffic, further extension of the NR system to support spectrum higher than 52.6 GHz is expected in the near future.

TABLE 1

| Frequency range designation | Corresponding frequency range |
|---|---|
| FR1 | 410 MHz-7125 MHz |
| FR2 | 24250 MHz-52600 MHz |

Overview of Rel-15 NR System
Numerology and Bandwidth Consideration for NR

The downlink transmission waveform in NR is conventional orthogonal frequency division multiplexing (OFDM) using a cyclic prefix (CP). The uplink transmission waveform is conventional OFDM using a cyclic prefix with a transform precoding function performing discrete Fourier transform (DFT) spreading that can be disabled or enabled. The basic transmitter block diagram for NR is illustrated in FIG. 1.

Multiple numerologies are supported in NR. A numerology is defined by sub-carrier spacing and CP overhead. Multiple subcarrier spacings (SCS) can be derived by scaling a basic subcarrier spacing by an integer $2^4$. The numerology used can be selected independently of the frequency band, although it is assumed not to use a very small subcarrier spacing at very high carrier frequencies. Flexible network and wireless device (WD) channel bandwidths are supported. The supported transmission numerologies in NR are summarized in Table 2.

TABLE 2

| μ | $\Delta f = 2^\mu \cdot 15$[kHz] | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

In RAN1, a maximum channel bandwidth per NR carrier is 400 MHz in 3GPP Rel-15. At least for single numerology, a candidate of the maximum number of subcarriers per NR carrier is 3300 in 3GPP Rel-15.

Downlink (DL) and uplink (UL) transmissions are organized into frames with 10 ms duration, consisting of ten 1 ms subframes. Each frame is divided into two equally sized half-frames of five subframes each. The slot duration is 14 symbols with Normal CP and 12 symbols with Extended CP, and scales in time as a function of the used sub-carrier spacing so that there is always an integer number of slots in a subframe. More specifically, the number of slots per subframe is $2^4$.

The basic NR downlink physical resource within a slot can thus be seen as a time-frequency grid as illustrated in in the example of FIG. 2 for 15 kHz sub-carrier spacing numerology, where each resource element corresponds to one OFDM subcarrier during one OFDM symbol interval. A resource block is defined as 12 consecutive subcarriers in the frequency domain. The uplink subframe has the same sub-carrier spacing as the downlink and the same number of single carrier frequency division multiple access (SC-FDMA) symbols in the time domain as OFDM symbols in the downlink.

Downlink transmissions are dynamically scheduled, i.e., in each slot the base station (gNB) transmits downlink control information (DCI) over a physical downlink control channel (PDCCH). The DCI tells the WD which resource blocks (RBs) in the current downlink slot the data is transmitted on. The WD data is carried on a physical downlink shared channel (PDSCH).

There are three DCI formats defined for scheduling the PDSCH in NR, i.e., DCI format 1_0, DCI format 1_1, and DCI format 1_2. DCI format 1_0 has a smaller size than DCI 1_1 and can be used when a WD is not connected to the network. DCI format 1_1 can be used for scheduling Multiple-Input-Multiple-Output (MIMO) transmissions with up to 2 transport blocks (TBs). DCI format 1_2 is introduced in 3GPP NR Technical Release 16 (3GPP Rel-16) to support configurable sizes for certain bit fields in the DCI.

A WD first detects and decodes the PDCCH and if the decoding is successful, it then decodes the corresponding PDSCH based on the decoded DCI carried in the PDCCH.

Uplink data transmissions are also dynamically scheduled using the PDCCH. Similar to the downlink, a WD first decodes an uplink grant in a PDCCH and then transmits data over a physical uplink shared channel (PUSCH) based on the decoded control information in the uplink grant such as modulation order, coding rate, uplink resource allocation, etc.

Consideration for Extended NR to a Higher Frequency Range

For extending NR operation above 52.6 GHZ, several challenges include designing a low complexity algorithm for phase noise (PN) compensation, designing phase tracking reference signals (PTRS) for a low complexity PN compensation algorithm, and coexistence of PTRS with existing NR reference signals such as tracking reference signals (TRS), channel state information reference signals (CSI-RS), and sounding reference signals.

Phase Noise

Oscillators are elements of transmitters and receivers in wireless systems. The main function of an oscillator is to generate a sine wave used to up-convert a base-band signal to a radio-frequency signal at the transmitter and down-convert a radio-frequency signal to a base-band signal at the receiver. Ideally, an oscillator generates a perfect sinusoidal signal with frequency $f_0$. In practical situations, the signal generated by oscillators is not perfect and has low random fluctuations in the phase, which are usually called phase noise. For an oscillator with a central frequency $f_0$, the effects of phase noise can be modelled as:

$$V(t)=\exp(j(2\pi t\, f_0+\phi(t)))\exp(j(2\pi f_0+\phi(t)))$$

where $\phi(t)$ is a stochastic process that modifies the phase of the ideal sinusoidal signal, and is called phase noise (PN). The level of the generated PN is dependent on the carrier frequency. The higher the carrier frequency, the higher the level of PN. For every doubling of the carrier frequency, the level of phase noise approximately increases by 6 dB. In OFDM signals, the impact of PN is observed as common phase error (CPE), which introduces a multiplicative phase distortion that is common across all sub-carriers, and as inter-carrier interference (ICI), which results from the loss of orthogonality between sub-carriers. The impact of PN on system performance can be sufficiently mitigated by applying CPE correction algorithms in FR1 and FR2. However, for extending NR operation above 52.6 GHz, ICI becomes predominant. The taps of the true ICI filter $\{J_i\}$ are unknown to the receiver and must be estimated.

3GPP NR Rel-16 Phase Tracking Reference Signal (PTRS)

For 3GPP NR Rel-16, the PTRS is a WD-specific RS which aims for phase rotation estimation and compensation. The PTRS is designed with various time and frequency densities and is mapped across the bandwidth part (BWP) allocated to a WD. Since CPE from PN is common across all the sub-carriers in an OFDM symbol while varying across time from symbol to symbol, typically, PTRS have lower density in frequency as illustrated in FIG. 3, but have higher density in time.

Examples of the various of PTRS patterns together with different TYPE-1 demodulation reference signals (DM-RS) patterns is shown in the example of FIG. 4.

The time-densest PTRS pattern is one where all OFDM symbols are mapped with a PTRS while the time-sparsest PTRS mapping is when the PTRS is mapped on every 4th OFDM symbol. Similarly, the densest PTRS frequency mapping is every 2nd physical resource block (PRB) while the sparsest is every 4th PRB. The faster the PN changes across OFDM symbols, the denser PTRS time mapping may be needed. At very high frequencies, e.g., in the 52.6-71 GHz band, the PN is expected to vary significantly from one OFDM symbol to the next. In fact, one cannot guarantee the time continuity of phase noise effects across OFDM symbols. This precludes the use of interpolation between OFDM symbols based on the time-spare PTRS patterns. High time-density may be needed in this case, e.g., every OFDM symbol.

PTRS is configurable depending on the quality of the oscillators, carrier frequency, OFDM subcarrier spacing, and modulation and coding schemes used for transmission. As discussed above, for NR operation above 52.6 GHz, ICI caused by phase noise begins to dominate, and therefore appropriate ICI suppression algorithms may need to be applied. To be able to suppress ICI, it must first be estimated, which is typically done over known PTRS symbols. A traditional approach of estimating ICI requires the use of a block of consecutive PTRS symbols, also called a block PTRS structure.

Let the transmitted symbol and the channel response for sub-carrier k be $S_k$ and $H_k$, respectively. The time-varying phase noise induces ICI in the frequency domain received signal $R_k$:

$$R_k = \sum_i J_i H_{k-i} S_{k-i} + W_k.$$

The taps of the true ICI filter $\{J_i\}$ are unknown to the receiver and must be estimated.

Denoting the sub-carrier indices of the block of M contiguous known PTRS symbols by $\{k_0, k_0+1, \ldots, k_0+M-1\}$. The object is to estimate a $(2u+1)$-tap ICI filter such that $$\sum_{m=-u}^{u} b_m H_{k-m} S_{k-m} \approx R_k$$

for $k \in \{k_0 + u, k_0 + u + 1, \ldots, k_0 + M - u - 1\}$.

The finite tap approximation of the ICI filter can be obtained from minimizing the following residue sum of squares:

5                                                                    6

$$\left\|\begin{bmatrix} H_{k_0+2u}S_{k_0+2u} & H_{k_0+2u-1}S_{k_0+2u-1} & \cdots & H_{k_0}S_{k_0} \\ H_{k_0+2u+1}S_{k_0+2u+1} & H_{k_0+2u}S_{k_0+2u} & \cdots & H_{k_0+1}S_{k_0+1} \\ \vdots & \vdots & \ddots & \vdots \\ H_{k_0+M-1}S_{k_0+M-1} & H_{k_0+M-2}S_{k_0+M-2} & \cdots & H_{k_0+M-2u-1}S_{k_0+M-2u-1} \end{bmatrix}\right.$$

$$\left.\begin{bmatrix} b_{-u} \\ b_{-u+1} \\ \vdots \\ b_u \end{bmatrix} - \begin{bmatrix} R_{k_0+u} \\ R_{k_0+u+1} \\ \vdots \\ R_{k_0+M-u-1} \end{bmatrix}\right\|^2 \triangleq \|X_u b_u - r_u\|^2$$

This is a least square problem with solution given by $$\hat{b}_u = \left(X_u^H X_u\right)^{-1} X_u^H r_u.$$

For an algorithm that solves this least square problem, the complexity (in terms of total MUL complexity) is:

$$\left[12 L N_{RB} + \frac{MC}{2}\left(L^2 + 5L\right)\left(1 - \frac{L-1}{M}\right)\right] + \frac{1}{6}L^3 + L^2,$$

where L=2u+1, C is the number of PTRS cluster, and M is the number of PTRS symbols in a cluster.

The 3GPP has considered using a cyclic sequence structure on the PTRS block, called cyclic block PTRS, to potentially reduce the complexity of the above ICI compensation algorithm.

SUMMARY

Some embodiments advantageously provide methods, systems, and apparatuses for low complexity intercarrier interference (ICI) compensation algorithms and cyclic block phase tracking reference signal (PTRS) sequence design.

According to some aspects, a cyclic block PTRS structure with identical sequence in all clusters reduces complexity of an ICI compensation algorithm. According to another aspect, a cyclic block PTRS structure with different sequences in different clusters reduces peak-to-average power ratio (PAPR) and cubic metric (CM). According to yet another aspect, a low complexity ICI compensation algorithm exploiting a circulant matrix constructed by cyclic PTRS sequence in a cyclic block PTRS is provided.

Some embodiments include a low complexity ICI compensation algorithm as well as enhancements on cyclic block PTRS to potentially decrease complexity of ICI compensation or PAPR/CM in the time domain as compared with other solutions. With enhancement of cyclic block PTRS, complexity of ICI compensation algorithms or PAPR/CM in the time domain can be reduced as compared with known solutions. Reduction in PAPR/CM may be beneficial to enable higher efficiency and/or lower cost power amplifiers.

According to one aspect, a method in a transmitter of a network node or wireless device is provided. The method includes determining a cyclic block phase tracking reference signal, PTRS, by cyclically extending a base sequence to enable a receiver of the PTRS to use an inter-carrier interference, ICI, compensation algorithm of a specified level of complexity. The method also includes transmitting the PTRS. In some embodiments, determining the PTRS includes determining a different PTRS for each of a plurality of clusters.

In some embodiments, the PTRS for each cluster is based at least in part on cyclically shifting the PTRS of a first cluster of the plurality of clusters. In some embodiments, cyclically shifting the PTRS includes shifting by an amount that is based at least in part on at least one of a resource block index, an orthogonal frequency division multiplex, OFDM, symbol index, a WD identification and a cell identification. In some embodiments, a PTRS for a cluster is determined based at least in part on an element-wise product in the frequency domain of a base sequence common to all of the plurality of clusters and a cluster-specific sequence. In some embodiments, the cluster-specific sequence is based at least in part on a complex exponential of a phase step times an index. In some embodiments, the cluster-specific sequence is based at least in part on a scrambling sequence. In some embodiments, the scrambling sequence is selected to minimize a peak to average power ratio of the transmitted PTRS. In some embodiments, cyclically extending the base sequence includes appending a cyclic prefix and a cyclic postfix to the base sequence. In some embodiments, cyclically extending the base sequence includes appending a last L−1 symbols of the base sequence to a beginning of the base sequence, L being a filter length of the ICI compensation algorithm.

According to another aspect, a transmitter for one of a network node and a wireless device, WD, is provided. The transmitter includes: processing circuitry configured to determine a cyclic block phase tracking reference signal, PTRS, by cyclically extending a base sequence to enable a receiver of the PTRS to use an inter-carrier interference, ICI, compensation algorithm of a specified level of complexity; and a radio interface in communication with the processing circuitry and configured to transmit the PTRS.

In some embodiments, the PTRS for each cluster is based at least in part on cyclically shifting the PTRS of a first cluster of the plurality of clusters. In some embodiments, cyclically shifting the PTRS includes shifting by an amount that is based at least in part on at least one of a resource block index, an orthogonal frequency division multiplex, OFDM, symbol index, a WD identification and a cell identification. In some embodiments, a PTRS for a cluster is determined based at least in part on an element-wise product in the frequency domain of a base sequence common to all of the plurality of clusters and a cluster-specific sequence. In some embodiments, the cluster-specific sequence is based at least in part on a complex exponential of a phase step times an index. In some embodiments, the cluster-specific sequence is based at least in part on a scrambling sequence. In some embodiments, the scrambling sequence is selected to minimize a peak to average power ratio of the transmitted PTRS. In some embodiments, cyclically extending the base sequence includes appending a cyclic prefix and a cyclic postfix to the base sequence. In some embodiments, cyclically extending the base sequence includes appending a last L−1 symbols of the base sequence to a beginning of the base sequence, L being a filter length of the ICI compensation algorithm.

According to another aspect, a method in a receiver of a wireless device and/or network node is provided. The method includes receiving a phase tracking reference signal, PTRS. The process also includes determining intercarrier interference, ICI, filter coefficients based at least in part on a circulant matrix of known PTRS, sequences, a PTRS being formed by cyclically extending a base sequence. The method also includes applying a filter having the determined ICI filter coefficients to the received PTRS.

In some embodiments, determining a set of ICI filter coefficients is further based in part on a channel equalization applied to the received PTRS. In some embodiments, the received PTRS includes a plurality of PTRS sequences, each PTRS sequence corresponding to a different cluster. In some embodiments, determining the ICI filter coefficients includes determining a vector of ICI filter coefficients that minimizes a residue sum of squares of terms involving the circulant matrix times an ICI filter coefficient vector minus an equalized received PTRS vector. In some embodiments, determining the vector of ICI filter coefficients that minimizes the residue sum of squares includes multiplying the circulant matrix by a Hermitian transpose of the circulant matrix. In some embodiments, determining the ICI filter coefficients includes multiplying an equalized received PTRS vector by an inverse of the circulant matrix. In some embodiments, determining the ICI filter coefficients includes performing an inverse discrete Fourier transform of an element-wise division of discrete Fourier transforms of the equalized received PTRS vector and one of a last column and last row of the circulant matrix. In some embodiments, determining the ICI filter coefficients includes determining an average of inverse discrete Fourier transforms over a plurality of clusters.

According to yet another aspect, a receiver for one of a WD and a network node includes a radio interface configured to receive a phase tracking reference signal, PTRS. The receiver also includes processing circuitry in communication with the radio interface and configured to: determine intercarrier interference, ICI, filter coefficients based at least in part on a circulant matrix of known phase tracking reference signal, PTRS, sequences, a PTRS being formed by cyclically extending a base sequence; and apply a filter having the determined ICI filter coefficients to a received PTRS.

In some embodiments, determining a set of ICI filter coefficients is further based in part on a channel equalization applied to the received PTRS. In some embodiments, the received PTRS includes a plurality of PTRS sequences, each PTRS sequence corresponding to a different cluster. In some embodiments, determining the ICI filter coefficients includes determining a vector of ICI filter coefficients that minimizes a residue sum of squares of terms involving the circulant matrix times an ICI filter coefficient vector minus an equalized received PTRS vector. In some embodiments, determining the vector of ICI filter coefficients that minimizes the residue sum of squares includes multiplying the circulant matrix by a Hermitian transpose of the circulant matrix. In some embodiments, determining the ICI filter coefficients includes multiplying an equalized received PTRS vector by an inverse of the circulant matrix. In some embodiments, determining the ICI filter coefficients includes performing an inverse discrete Fourier transform of an element-wise division of discrete Fourier transforms of the equalized received PTRS vector and one of a last column and last row of the circulant matrix. In some embodiments, determining the ICI filter coefficients includes determining an average of inverse discrete Fourier transforms over a plurality of clusters.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 11 is a flowchart of an example process in a network node according to some embodiments of the present disclosure;

FIG. 12 is a flowchart of an example process in a wireless device according to some embodiments of the present disclosure;

DETAILED DESCRIPTION

Figure 1:
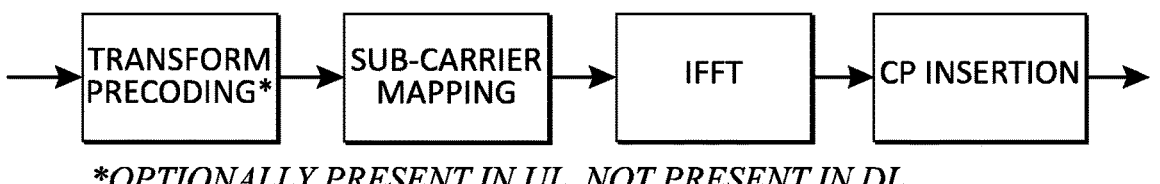
FIG. 1 is block diagram of an NR transmitter for CP-OFDM with optional DFT spreading.
Figure 2:
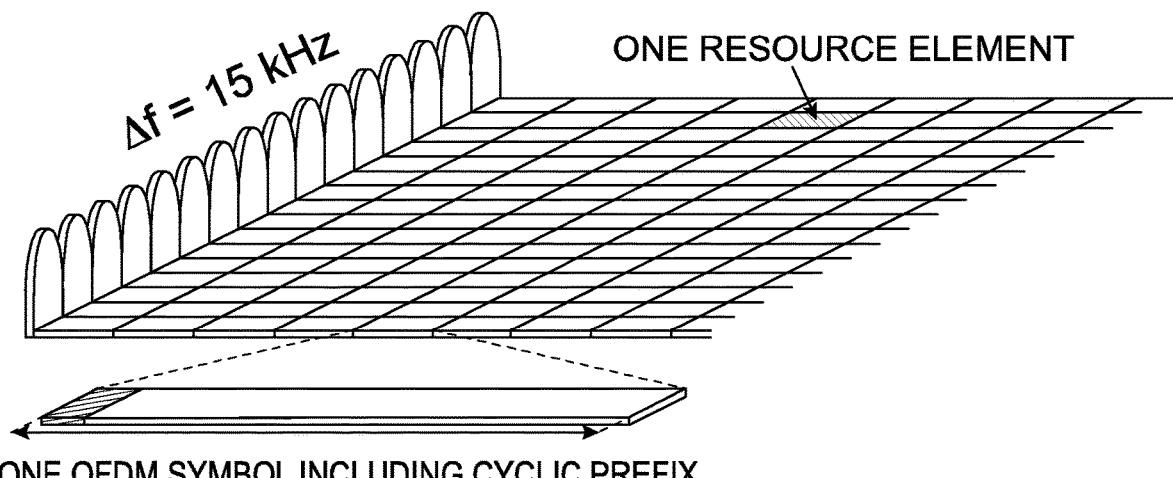
FIG. 2 is an illustration of downlink physical resources.
Figure 3:
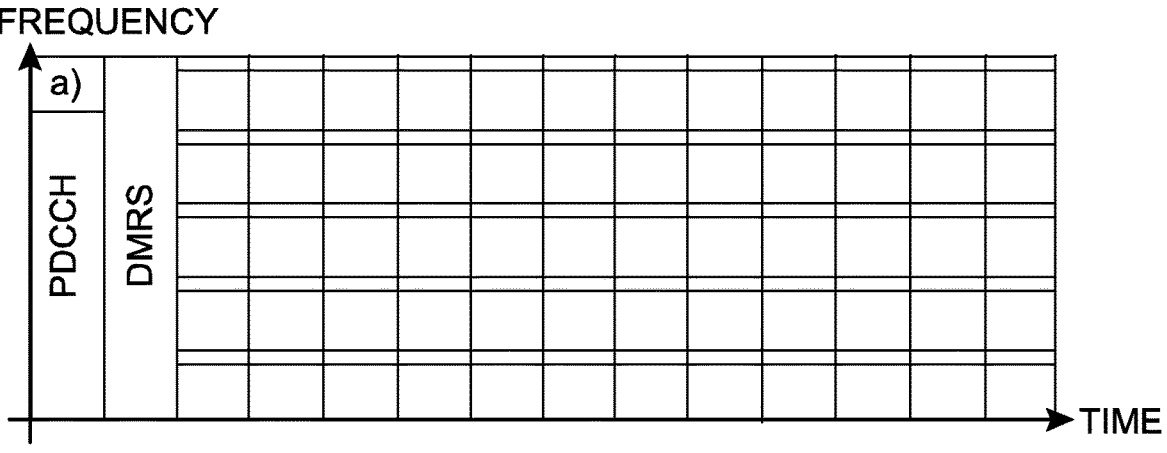
FIG. 3 is an illustration of NR PTRS distributed in the frequency domain.
Figure 4:
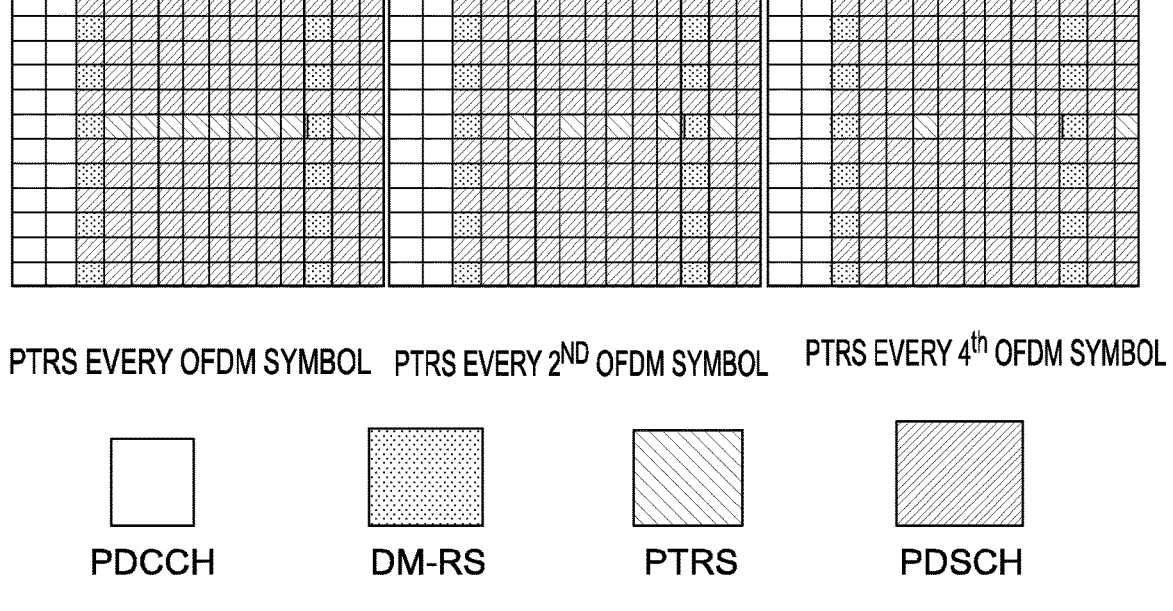
FIG. 4 is an illustration of PTRS with DMRS mapping in NR.

Before describing in detail example embodiments, it is noted that the embodiments reside primarily in combinations of apparatus components and processing steps related to low complexity intercarrier interference (ICI) compensation algorithms and cyclic block phase tracking reference signal (PTRS) sequence design. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IOT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide low complexity intercarrier interference (ICI) compensation algorithms and cyclic block phase tracking reference signal (PTRS) sequence design.

According to one aspect, a method in a network node includes generating a PTRS, having a PTRS sequence that is configured to lower a complexity of an ICI compensation algorithm. According to another aspect, a method in a wireless device (WD) includes determining an ICI compensation algorithm based at least in part on a PTRS having a PTRS sequence, and applying the determined ICI compensation algorithm to compensate for ICI.

Figure 5:
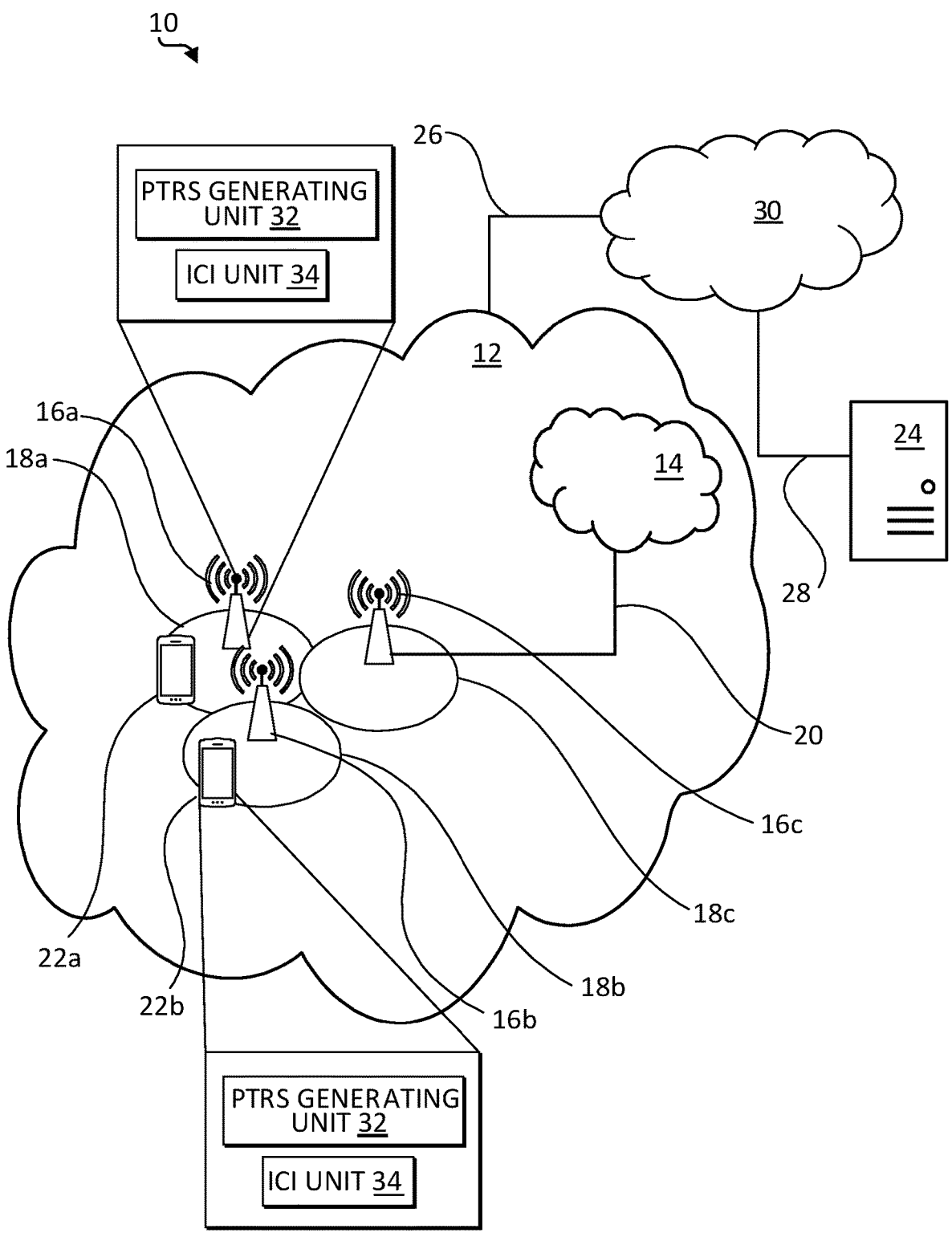
FIG. 5 is a schematic diagram of an example network architecture illustrating a communication system connected via an intermediate network to a host computer according to the principles in the present disclosure.

Returning now to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 5 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 and/or a WD 22 is configured to include a PTRS generating unit 32 which is configured to generate a phase tracking reference signal, PTRS, having a PTRS sequence that is configured to achieve a specified level of a complexity of an intercarrier interference, ICI, compensation algorithm. In some embodiments, the PTRS generating unit 32 may be configured to determine a cyclic block phase tracking reference signal, PTRS, by cyclically extending a base sequence to enable a receiver of the PTRS to use an inter-carrier interference, ICI, compensation algorithm of a specified level of complexity. A network node and/or wireless device 22 is configured to include an ICI unit 34 which is configured to determine an intercarrier interference, ICI, compensation algorithm based at least in part on a phase tracking reference signal, PTRS having a PTRS sequence. In some embodiments, the ICI unit 34 may be configured to determine ICI filter coefficients based at least in part on a circulant matrix of known PTRS sequences, a PTRS being formed by cyclically extending a base sequence.

Example implementations, in accordance with an embodiment, of the WD 22, network node 16 and host computer 24 discussed in the preceding paragraphs will now be described with reference to FIG. 6. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The transmitter(s) and receiver(s) of the radio interface 62 may include processing circuitry to implement at least some of the functionality of the PTRS generating unit 32 and/or the ICI unit 34. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a PTRS generating unit 32 which is configured to generate a phase tracking reference signal, PTRS, having a PTRS sequence that is configured to achieve a specified level of a complexity of an intercarrier interference, ICI, compensation algorithm. The PTRS generating unit 32 may be configured to determine a cyclic block phase tracking reference signal, PTRS, by cyclically extending a base sequence to enable a receiver of the PTRS to use an inter-carrier interference, ICI, compensation algorithm of a specified level of complexity. Processing circuitry 68 may also include an ICI unit 34 which may be configured to determine ICI filter coefficients based at least in part on a circulant matrix of known PTRS sequences, a PTRS being formed by cyclically extending a base sequence. Although the processing circuitry 68 is shown separate from the radio interface 62 of the network node 16, some or all of the processing circuit 68 and/or the PTRS generating unit 32 and/or the ICI unit 34 may reside in the radio interface 62.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers. The transmitter(s) and receiver(s) of the radio interface 82 may include processing circuitry to implement at least some of the functionality of the PTRS generating unit 32 and/or the ICI unit 34.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an ICI unit 34 which is configured to determine an intercarrier interference, ICI, compensation algorithm based at least in part on a phase tracking reference signal, PTRS having a PTRS sequence. The ICI unit 34 may also be configured to determine ICI filter coefficients based at least in part on a circulant matrix of known PTRS sequences, a PTRS being formed by cyclically extending a base sequence. The processing circuitry 84 of the WD 22 may also include the PTRS generating unit 32, which may be configured to determine a cyclic block phase tracking reference signal, PTRS, by cyclically extending a base sequence to enable a receiver of the PTRS to use an inter-carrier interference, ICI, compensation algorithm of a specified level of complexity. Although the processing circuitry 84 is shown separate from the radio interface 82 of the wireless device 16, some or all of the processing circuitry 84 and/or the PTRS generating unit 32 and/or the ICI unit 34 may reside in the radio interface 82.

Figure 6:
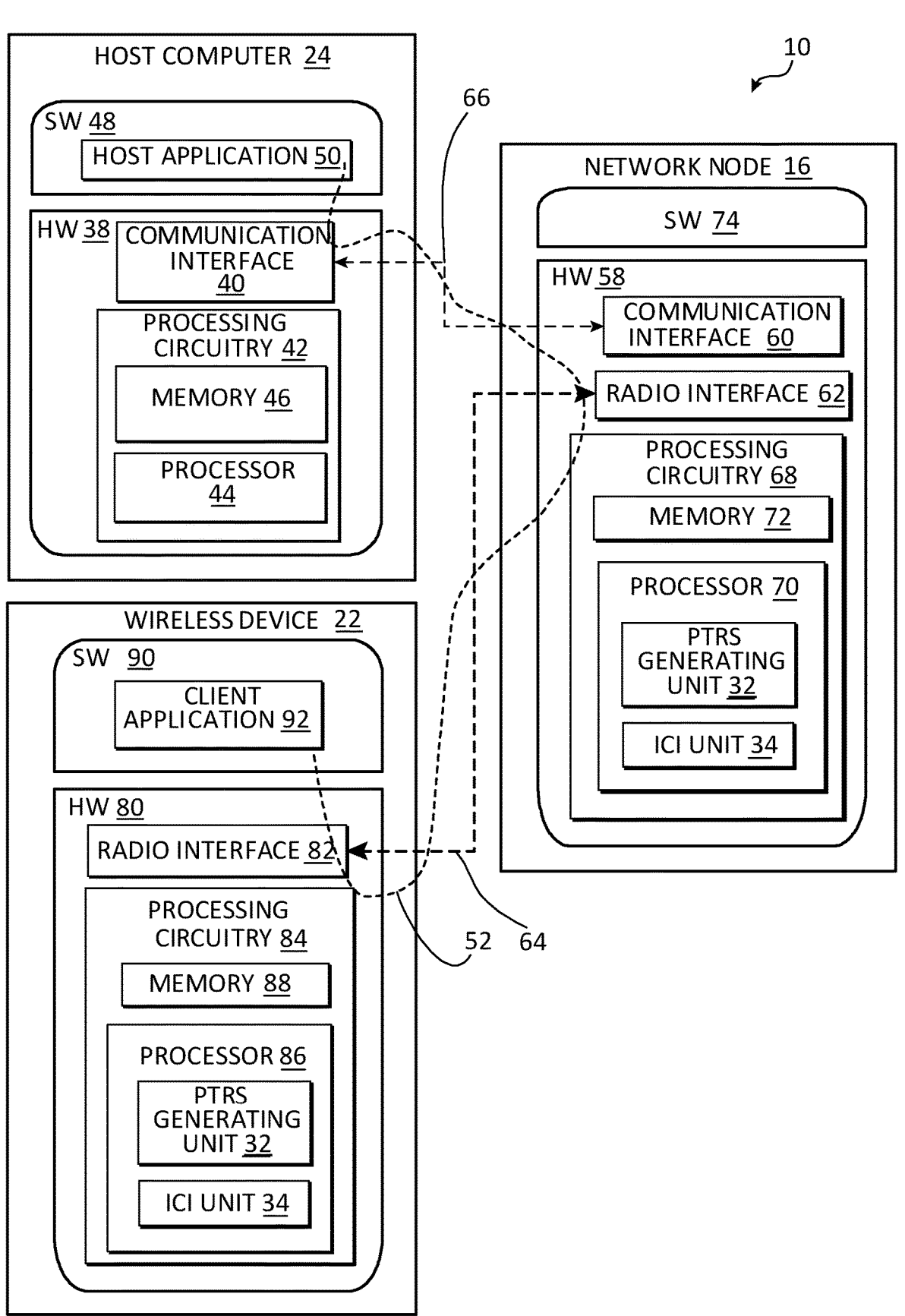
FIG. 6 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 5 and 6 show various "units" such as PTRS generating unit 32, and ICI unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 7, 8:
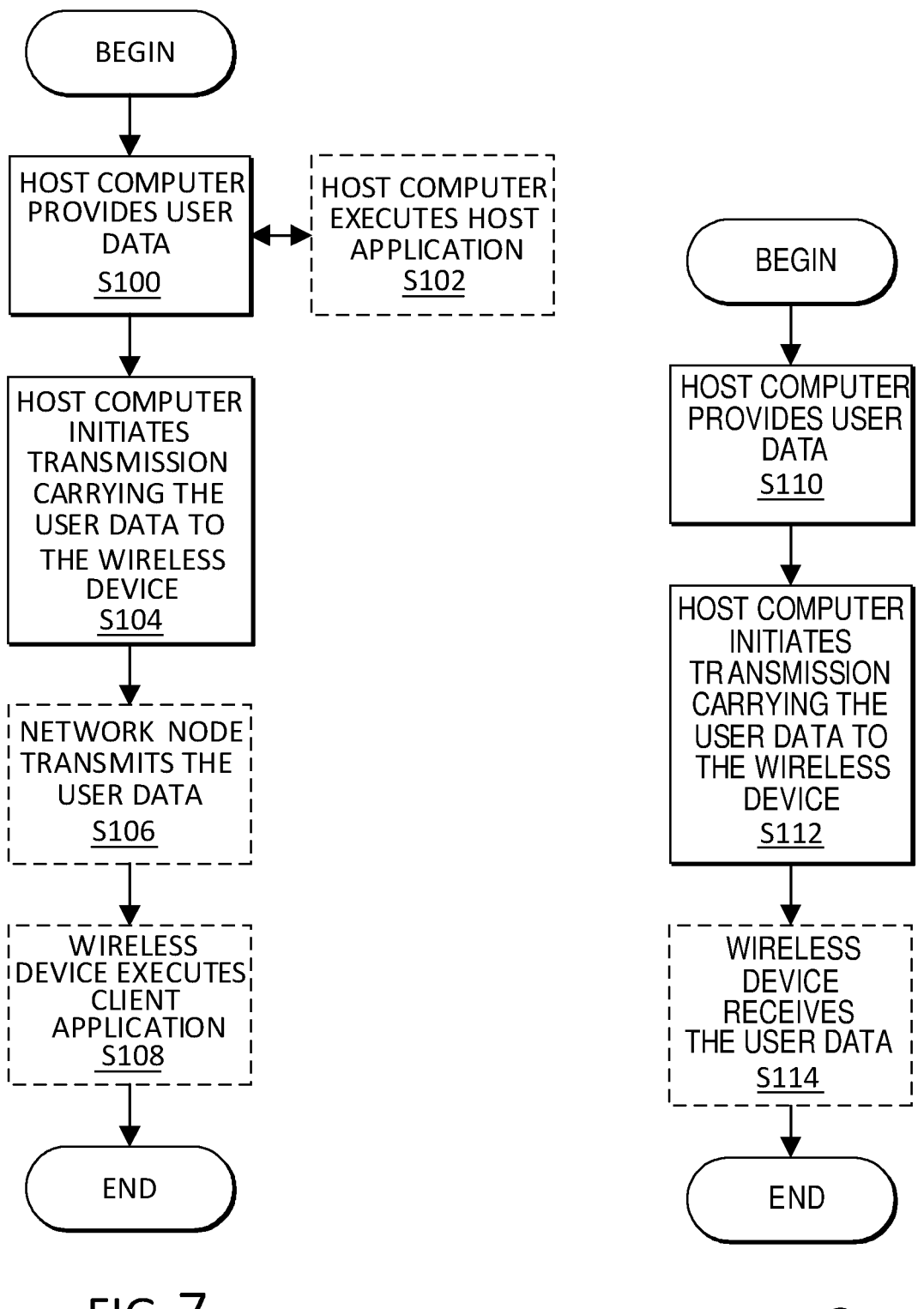
FIG. 7 is a flowchart illustrating example methods implemented in a communication system including a host computer, a network node and a wireless device for executing a client application at a wireless device according to some embodiments of the present disclosure.
FIG. 8 is a flowchart illustrating example methods implemented in a communication system including a host computer, a network node and a wireless device for receiving user data at a wireless device according to some embodiments of the present disclosure.

FIG. 7 is a flowchart illustrating an example method implemented in a communication system, such as, for example, the communication system of FIGS. 5 and 6, in accordance with one embodiment. The communication system may include a host computer 24, a network node 16 and a WD 22, which may be those described with reference to FIG. 6. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 8 is a flowchart illustrating an example method implemented in a communication system, such as, for example, the communication system of FIG. 5, in accordance with one embodiment. The communication system may include a host computer 24, a network node 16 and a WD 22, which may be those described with reference to FIGS. 5 and 6. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 9, 10:
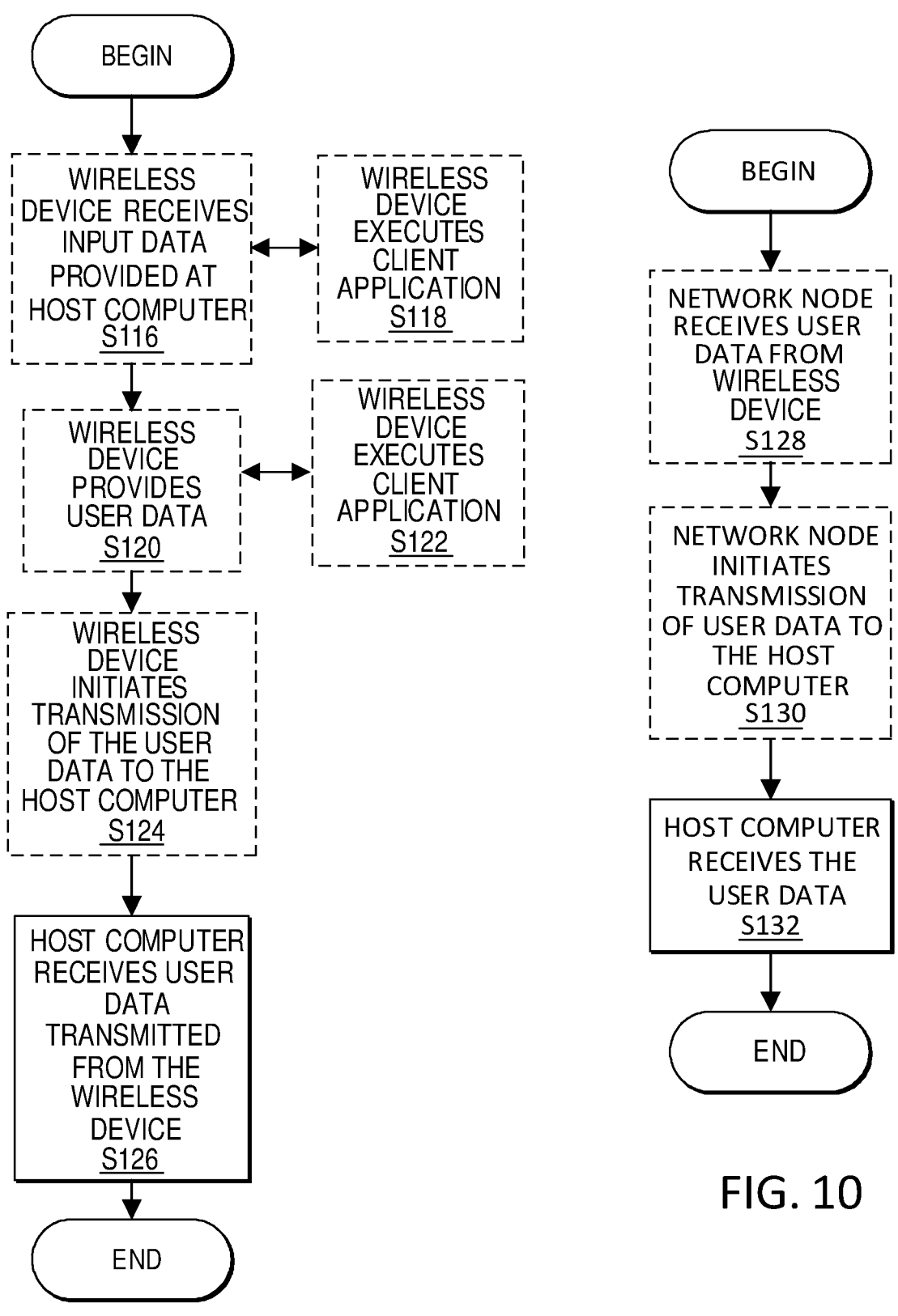
FIG. 9 is a flowchart illustrating example methods implemented in a communication system including a host computer, a network node and a wireless device for receiving user data from the wireless device at a host computer according to some embodiments of the present disclosure.
FIG. 10 is a flowchart illustrating example methods implemented in a communication system including a host computer, a network node and a wireless device for receiving user data at a host computer according to some embodiments of the present disclosure.

FIG. 9 is a flowchart illustrating an example method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 10 is a flowchart illustrating an example method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 11 is a flowchart of an example process in a network node 16 according to principles set forth herein. One or more blocks described herein may be performed by one or more elements of network node 16 such as by one or more of processing circuitry 68 (including the PTRS generating unit 32), processor 70, radio interface 62 and/or communication interface 60. Network node 16 such as via processing circuitry 68 and/or processor 70 and/or radio interface 62 and/or communication interface 60 is configured to generate a phase tracking reference signal, PTRS, having a PTRS sequence that is configured to achieve a specified level of a complexity of an intercarrier interference, ICI, compensation algorithm (Block S134).

FIG. 12 is a flowchart of an example process in a wireless device 22 according to some embodiments of the present disclosure. One or more blocks described herein may be performed by one or more elements of wireless device 22 such as by one or more of processing circuitry 84 (including the ICI unit 34), processor 86, radio interface 82 and/or communication interface 60. Wireless device 22 such as via processing circuitry 84 and/or processor 86 and/or radio interface 82 is configured to determine an intercarrier interference, ICI, compensation algorithm based at least in part on a phase tracking reference signal, PTRS having a PTRS sequence (Block S136). The process also includes applying the determined ICI compensation algorithm to compensate for ICI (Block S138).

Figure 13:
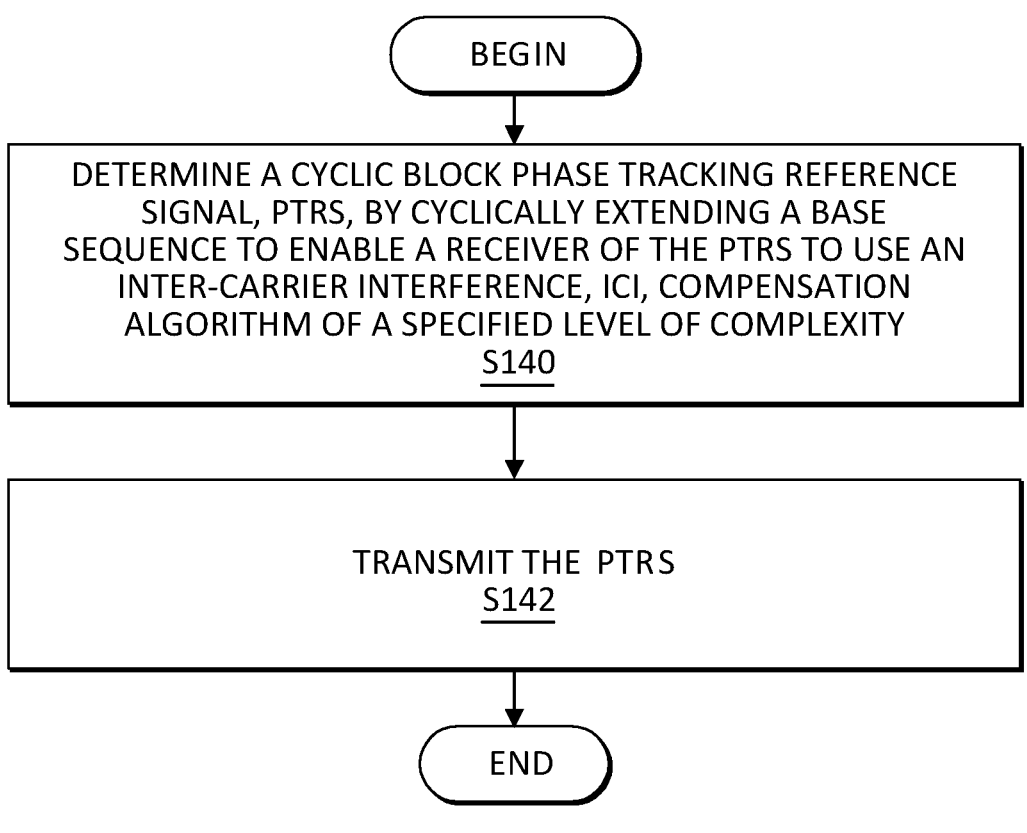
FIG. 13 is a flowchart of an example process in a transmitter of a network node or wireless device according to some embodiments of the present disclosure.

FIG. 13 is a flowchart of an example process in a radio interface 62, 82 and/or processing circuitry 68, 84 of a network node 16 or wireless device 22, including PTRS generating unit 32 and/or ICI unit 34. The process includes determining a cyclic block phase tracking reference signal, PTRS, by cyclically extending a base sequence to enable a receiver of the PTRS to use an inter-carrier interference, ICI, compensation algorithm of a specified level of complexity (Block S140). The method also includes transmitting the PTRS (Block S142).

In some embodiments, determining the PTRS includes determining a different PTRS for each of a plurality of clusters. In some embodiments, the PTRS for each cluster is based at least in part on cyclically shifting the PTRS of a first cluster of the plurality of clusters. In some embodiments, cyclically shifting the PTRS includes shifting by an amount that is based at least in part on at least one of a resource block index, an orthogonal frequency division multiplex, OFDM, symbol index, a WD identification and a cell identification. In some embodiments, a PTRS for a cluster is determined based at least in part on an element-wise product in the frequency domain of a base sequence common to all of the plurality of clusters and a cluster-specific sequence. In some embodiments, the cluster-specific sequence is based at least in part on a complex exponential of a phase step times an index. In some embodiments, the cluster-specific sequence is based at least in part on a scrambling sequence. In some embodiments, the scrambling sequence is selected to minimize a peak to average power ratio of the transmitted PTRS. In some embodiments, cyclically extending the base sequence includes appending a cyclic prefix and a cyclic postfix to the base sequence. In some embodiments, cyclically extending the base sequence includes appending a last $L-1$ symbols of the base sequence to a beginning of the base sequence, L being a filter length of the ICI compensation algorithm.

Figure 14:
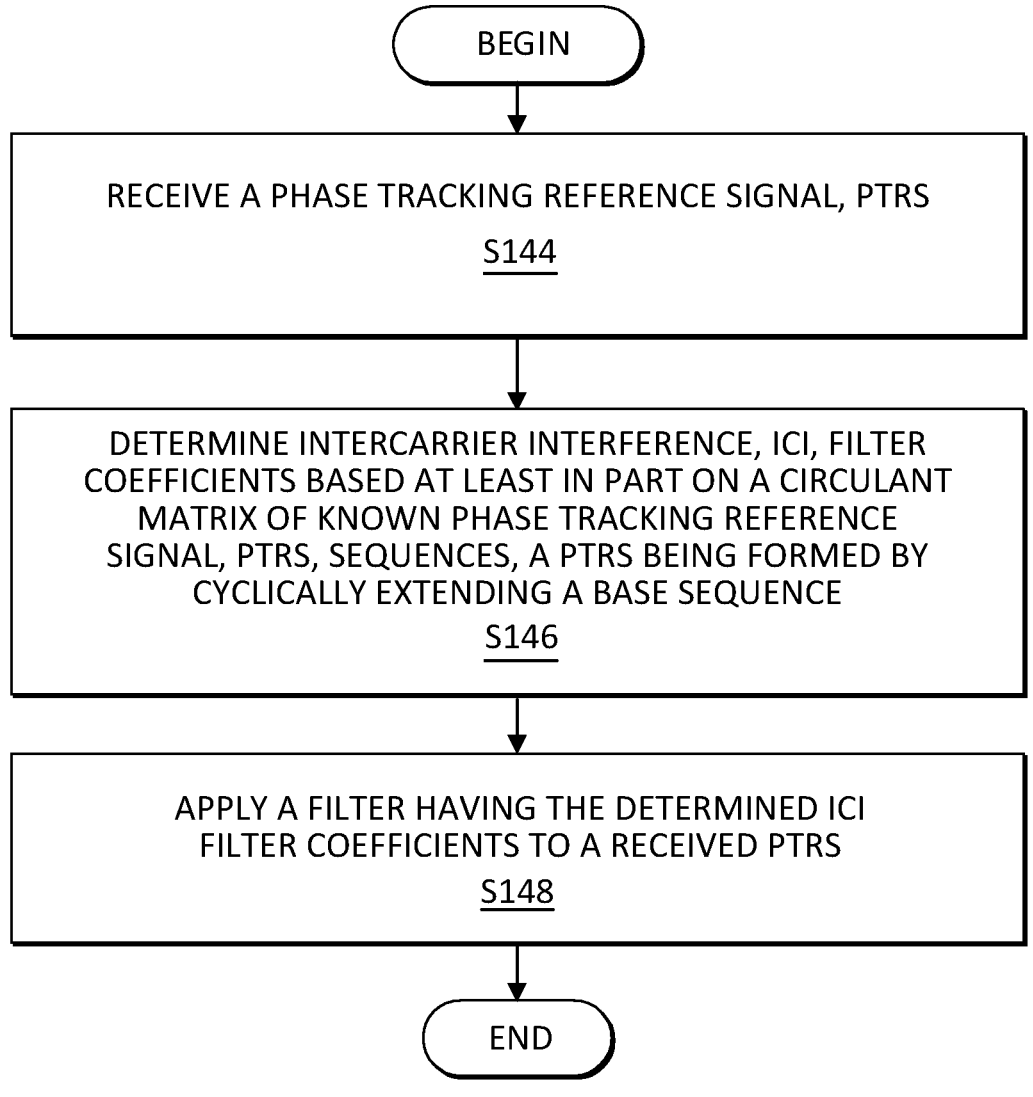
FIG. 14 is a flowchart of an example process in receiver of a network node or wireless device according to some embodiments of the present disclosure.

FIG. 14 is a flowchart of an example process in a radio interface 62, 82 and/or processing circuitry 68, 84 of a network node 16 or wireless device 22, including PTRS generating unit 32 and/or ICI unit 34. The process includes receiving a phase tracking reference signal, PTRS (Block S144). The process also includes determining intercarrier interference, ICI, filter coefficients based at least in part on a circulant matrix of known PTRS, sequences, a PTRS being formed by cyclically extending a base sequence (Block S146). The method also includes applying a filter having the determined ICI filter coefficients to the received PTRS (Block S148).

In some embodiments, determining a set of ICI filter coefficients is further based in part on a channel equalization applied to the received PTRS. In some embodiments, the received PTRS includes a plurality of PTRS sequences, each PTRS sequence corresponding to a different cluster. In some embodiments, determining the ICI filter coefficients includes determining a vector of ICI filter coefficients that minimizes a residue sum of squares of terms involving the circulant matrix times an ICI filter coefficient vector minus an equalized received PTRS vector. In some embodiments, determining the vector of ICI filter coefficients that minimizes the residue sum of squares includes multiplying the circulant matrix by a Hermitian transpose of the circulant matrix. In some embodiments, determining the ICI filter coefficients includes multiplying an equalized received PTRS vector by an inverse of the circulant matrix. In some embodiments, determining the ICI filter coefficients includes performing an inverse discrete Fourier transform of an element-wise division of discrete Fourier transforms of the equalized received PTRS vector and one of a last column and last row of the circulant matrix. In some embodiments, determining the ICI filter coefficients includes determining an average of inverse discrete Fourier transforms over a plurality of clusters.

Having described the general process flow of arrangements of the disclosure and having provided examples of hardware and software arrangements for implementing the processes and functions of the disclosure, the sections below provide details and examples of arrangements for low complexity intercarrier interference (ICI) compensation algorithms and cyclic block phase tracking reference signal (PTRS) sequence design.

Figure 15:
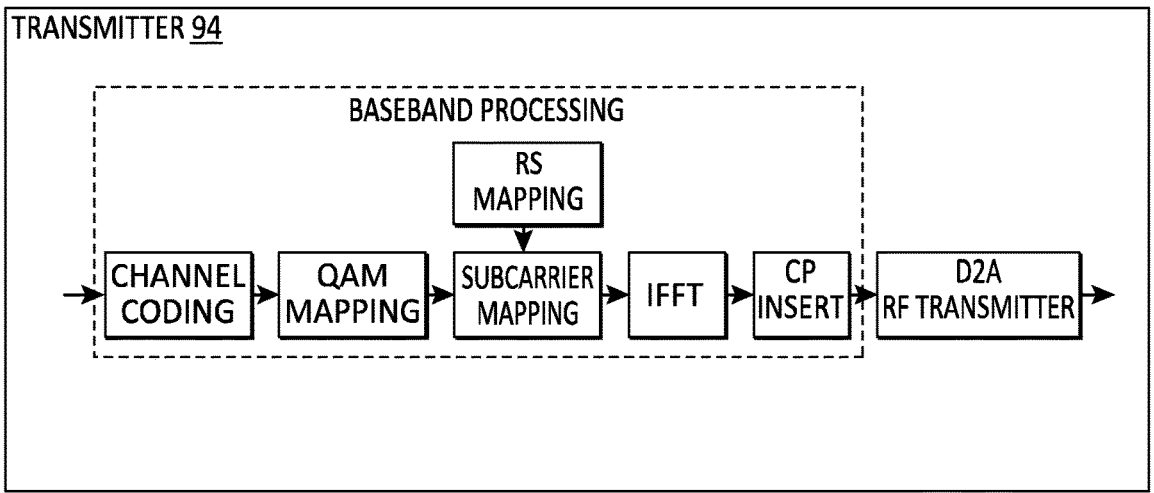
FIG. 15 is a block diagram of a baseband processor of an OFDM transmitter.

Returning once again to the drawing figures, a nonlimiting example of a baseband processing block of a transmitter 94 for transmitting OFDM transmissions is illustrated in FIG. 15. The transmitter 94 may be implemented in a network node 16 or a WD 22, via the radio interface 62, 82 and/or processing circuitry 68, 84. Information bits are channel coded and are then mapped to quadrature amplitude modulation (QAM) symbols. One or more of the functions described with respect to the baseband processing block may also be performed by the corresponding processing circuitry 68 or 82. The QAM symbols and reference symbols (including and not limited to demodulation reference signals (DMRS) and phase tracking reference signals (PTRS)) are mapped to the corresponding frequency and time resources according to communications protocols. The frequency domain signal is then converted into the time domain via an inverse fast Fourier transform (FFT). After cyclic prefix insert, the baseband signal is sent to digital-to-analog and radio frequency (RF) transmitter front end.

Figure 16:
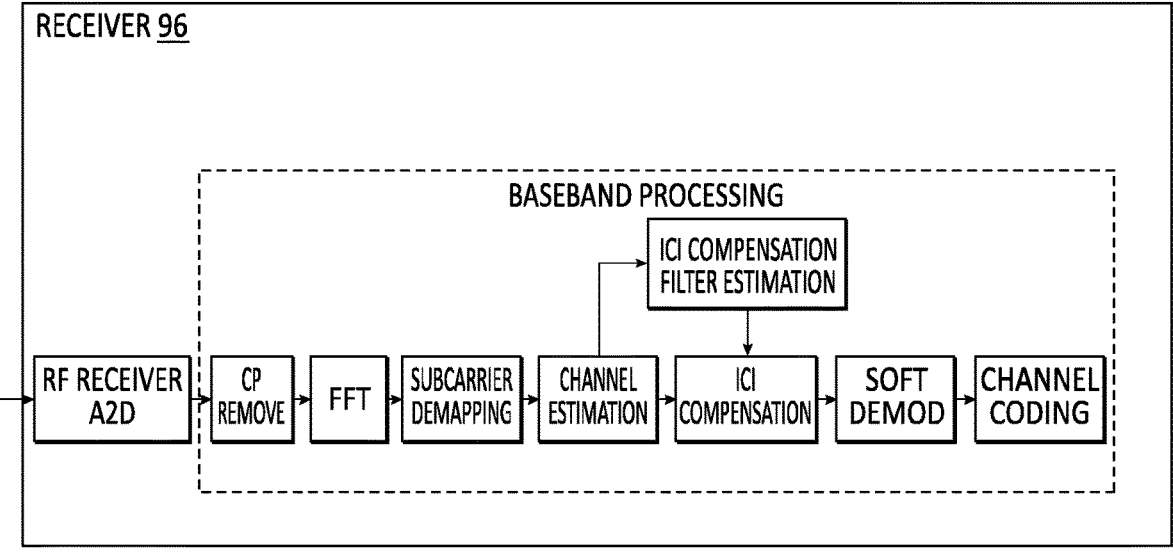
FIG. 16 is a block diagram of a baseband processor of a receiver for receiving an OFDM transmission.

A nonlimiting example of a baseband processing block of a receiver 96 for receiving OFDM transmissions is illustrated in FIG. 16. The receiver 96 may be implemented in a network node 16 or a WD 22, via the radio interface 62, 82 and/or processing circuitry 68, 84. One of more of the functions described with respect to the baseband processing block may also be performed by the corresponding processing circuitry 68 or 84. The received RF signal is converted to the baseband by the RF receiver frontend and analog-to-digital circuits. After removing the cyclic prefix, the time domain signal is converted to the frequency domain via an FFT. The DMRS are extracted for estimating the channel coefficients. The received signal from PTRS and channel estimation coefficients are then used to estimate an ICI compensation filter to mitigate the phase noise degradation to the signal. After ICI compensation, the signals may be fed to soft demodulators to compute soft bit values. The soft values may be processed by channel decoding to recover the information bits.

Figure 17:
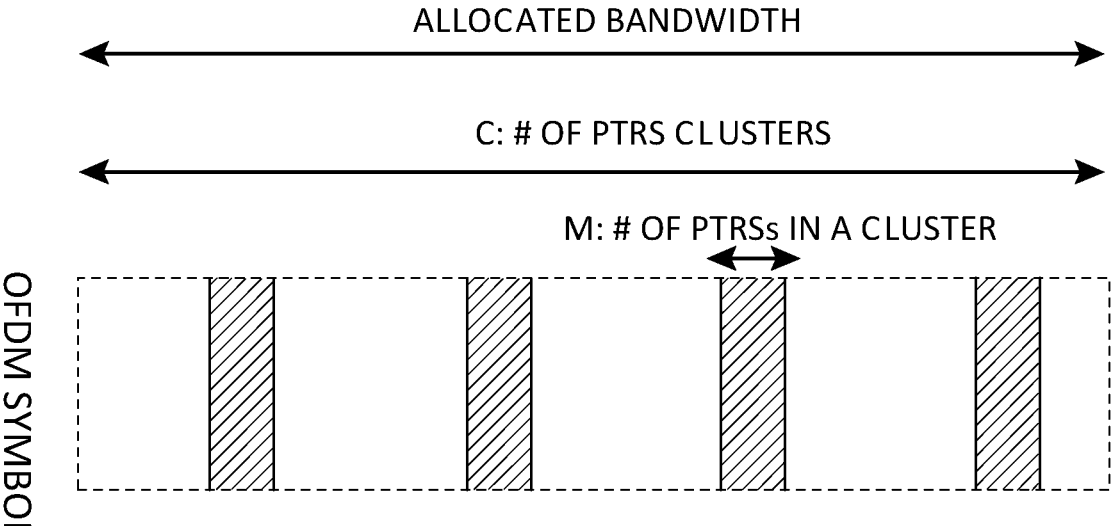
FIG. 17 is an illustration of a clustered PTRS structure.

For estimating the impact of the phase noise on the received signal, the phase tracking reference signal (PTRS)

may be modeled as a clustered block PTRS. FIG. 17 shows a clustered block PTRS structure that has C clusters (blocks) of M PTRS REs.

Figure 18:
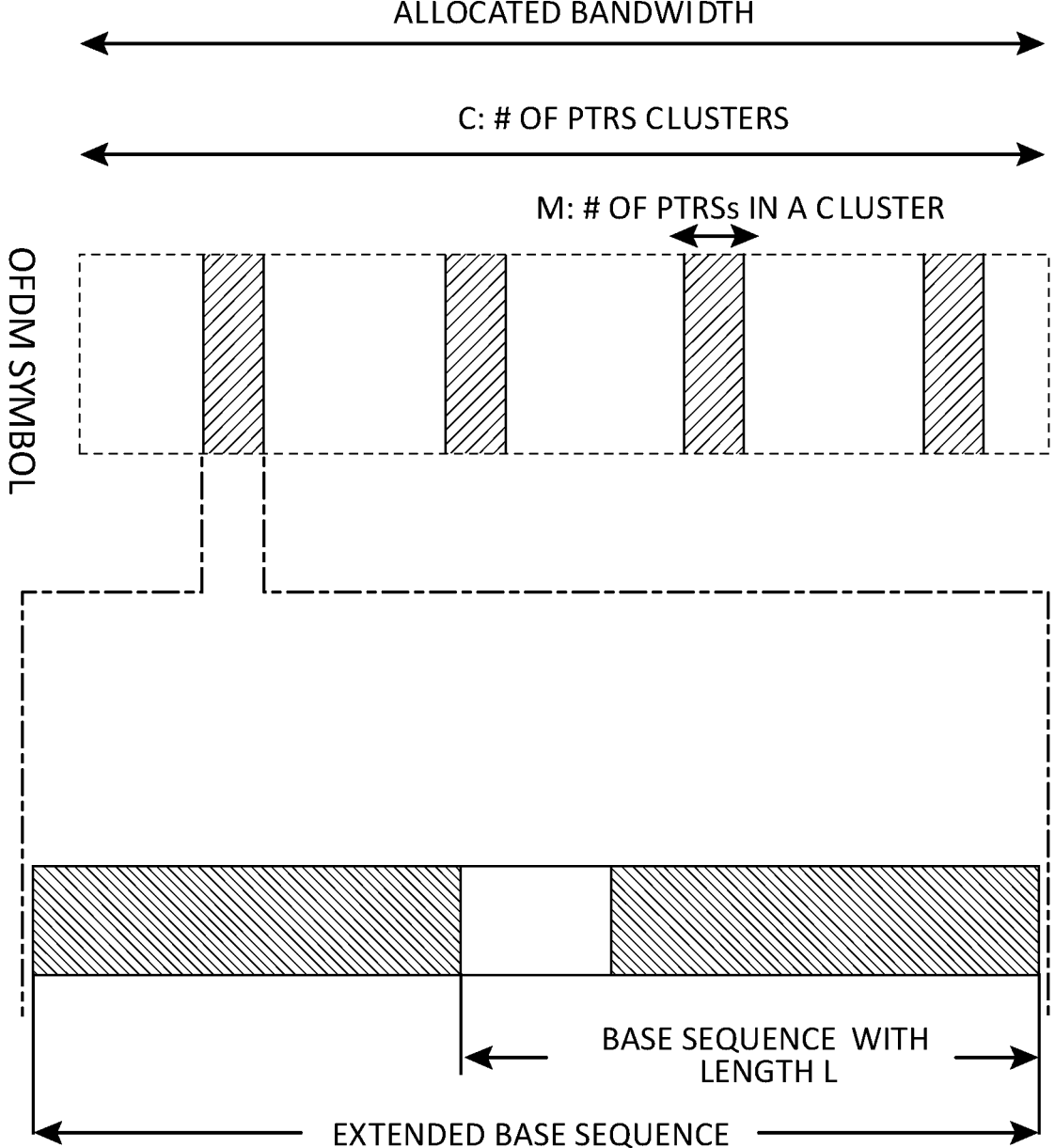
FIG. 18 is an illustration of a cyclic block PTRS structure.
Figure 19:
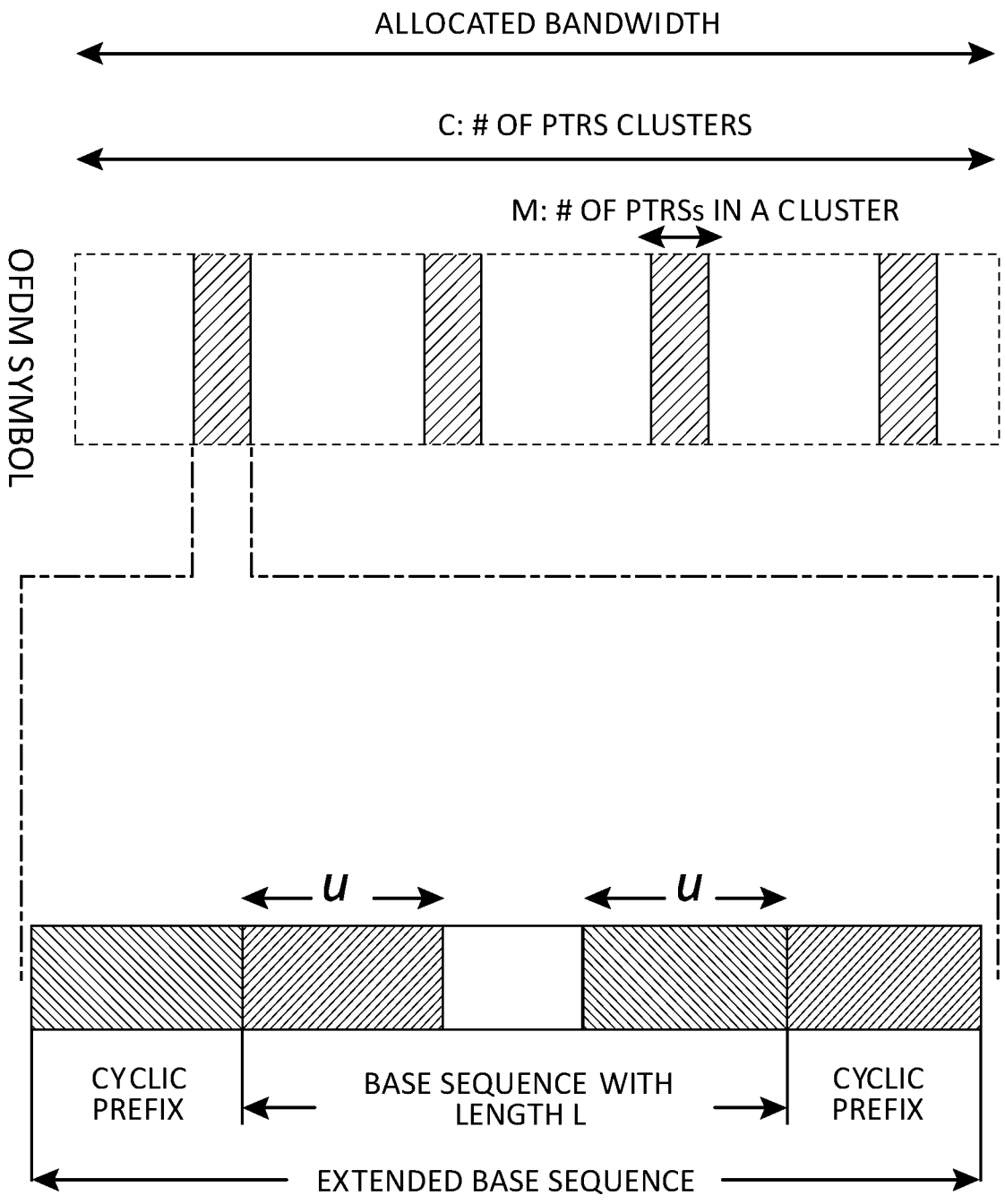
FIG. 19 is an illustration of an alternative cyclic block PTRS structure.

A non-limiting example of constructing a cyclic sequence by appending the last L−1 symbols of the base sequence to the beginning of the base sequence is shown in FIG. 18. A non-limiting example of constructing cyclic sequence by appending a cyclic prefix and a cyclic postfix to the base sequence is shown in FIG. 19.

In the receiver embodiments described below, e.g., a receiver of the radio interface 62 or 82, the following notation is defined.

Let $R_k$ denote the received value on sub-carrier k.

Let $S_k$ denote the transmitted symbol on said sub-carrier k.

If the sub-carrier carries a PTRS, the value of $S_k$ is known to the receiver.

Let $H_k$ denoted the effective channel coefficient on said sub-carrier k. The time-varying phase noise induces ICI in the received signal $R_k$:

$$R_k = \sum_i J_i H_{k-i} S_{k-i} + W_k,$$

where the taps of the true ICI filter $[J_i]$ are unknown to the receiver and must be estimated, and $W_k$ denotes the white noise of power ow on sub-carrier k;

The sub-carrier indices of the block of M contiguous known PTRS symbols are denoted by $\{k_0, k_0+1, \ldots, k_0+M-1\}$. The object is to estimate a $(2u+1)$-tap filter such that:

$$\sum_{m=-u}^{u} b_m H_{k-m} S_{k-m} \approx R_k$$

for $k \in \{k_0 + u, k_0 + u + 1, \ldots, k_0 + M - u - 1\}$.

Receiver Embodiment 0: Baseline ICI compensation algorithm exploiting circulant matrix:

In this embodiment, a baseline ICI compensation algorithm is described which exploits a circulant matrix. This algorithm may be performed by radio interface 62, 82 and/or processing circuitry 68, 84, for example. Receiver Embodiments #1 and #2, discussed below, are lower complexity versions of Embodiment 0. After channel equalization, the received value on sub-carrier k is:

$$Y_k = \frac{R_k}{H_k} = \frac{1}{H_k} \sum_{m=-u}^{u} b_m H_{k-m} S_{k-m} \approx \sum_{m=-u}^{u} b_m S_{k-m},$$

The above approximation is valid if the channel remains relatively flat on the subcarrier level. The finite tap approximation of the ICI filter can be obtained by minimizing the following residue sum of squares:

$$RSS \triangleq \sum_{c=0}^{C-1} \left\| \begin{bmatrix} S_{k_c+2u} & S_{k_c+2u-1} & \cdots & S_{k_c} \\ S_{k_c+2u+1} & S_{k_c+2u} & \cdots & S_{k_c+1} \\ \vdots & \vdots & \ddots & \vdots \\ S_{k_c+M-1} & S_{k_c+M-2} & \cdots & S_{k_c+M-2u-1} \end{bmatrix} \right.$$

-continued $$\left\|\begin{bmatrix} b_{-u} \\ b_{-u+1} \\ \vdots \\ b_u \end{bmatrix} - \begin{bmatrix} R_{k_c+u}/H_{k_c+u} \\ R_{k_c+u+1}/H_{k_c+u+1} \\ \vdots \\ R_{k_c+M-u-1}/H_{k_c+M-u-1} \end{bmatrix}\right\|^2,$$

where C is the total number of cluster and M is the total number PTRS REs in each cluster. To proceed with ICI compensation filtering, the known PTRS values for each cluster $c \in \{0, 2, \ldots C-1\}$ are collected into an $(M-2u) \times (2u+1)$ matrix $S_{u,c}$:

$$S_{u,c} = \begin{bmatrix} S_{k_c+2u} & S_{k_c+2u-1} & \cdots & S_{k_c} \\ S_{k_c+2u+1} & S_{k_c+2u} & \cdots & S_{k_c+1} \\ \vdots & \vdots & \ddots & \vdots \\ S_{k_c+M-1} & S_{k_c+M-2} & \cdots & S_{k_c+M-2u-1} \end{bmatrix}.$$

The ICI compensation filter coefficients are collected into a vector $b_u$:

$$b_u \triangleq \begin{bmatrix} b_{-u} \\ b_{-u+1} \\ \vdots \\ b_u \end{bmatrix}.$$

The equalized received signals at PTRS subcarriers in cluster for each cluster $c \in \{0, 2, \ldots C-1\}$ are collected into a vector $y_{u,c}$:

$$y_{u,c} \triangleq \begin{bmatrix} R_{k_c+u}/H_{k_c+u} \\ R_{k_c+u+1}/H_{k_c+u+1} \\ \vdots \\ R_{k_c+M-u-1}/H_{k_c+M-u-1} \end{bmatrix}.$$

The above residue sum of squares (RSS) can be expressed as $$RSS = \sum_{c=0}^{C-1} \|S_{u,c} b_u - y_{u,c}\|^2.$$

By setting the first derivative of the RSS with respect to by to zero, the solution to this least square problem can be found to be:

$$\hat{b}_u = \left(\sum_{c=0}^{C-1} S_{u,c}^H S_{u,c}\right)^{-1} \left(\sum_{c=0}^{C-1} S_{u,c}^H y_{u,c}\right).$$

Complexity Analysis
Estimation of the Approximate ICI Filter
Formation of the $(M-L+1) \times L$ matrix $S_{u,c}$ in C clusters: $L(M-L+1)C$ MUL; Formation of the $L \times L$ Hermitian matrix $$\sum_{c=0}^{C-1} S_{u,c}^H S_{u,c}: \frac{1}{2} L(L+1)(M-L+1)C\,MUL:$$

There are only $\frac{1}{2} L(L+1)$ independent values in an $L \times L$ Hermitian matrix. Each value requires $(M-L+1)C$ MUL to compute.
Formation of L−1 vector $$\sum_{c=0}^{C-1} S_{u,c}^H y_{u,c}: L(M - L + 1)CMUL;$$

and/or
Solving for $$\hat{b}_u: \frac{1}{6} L^3 + L^2 MUL:$$

The MUL complexity of computing the Cholesky decomposition $$\sum_{c=0}^{C-1} S_{u,c}^H S_{u,c} = LDL^H \text{ is } L^3/6.$$

The MUL complexity of solving $$LDL^H \hat{b}_u = \sum_{c=0}^{C-1} S_{u,c}^H y_{u,c} \text{ is } L^2.$$

Filtering of the physical shared channel: $L \cdot 12 \, N_{RB}$ MUL:
The total MUL complexity is then given by:

$$\left[12LN_{RB} + \frac{MC}{2}(L^2 + 5L)\left(1 - \frac{L-1}{M}\right)\right] + \frac{1}{6}L^3 + L^2,$$

where $L=2u+1$ and $N_{RB}$ is total number of RBs.

In the following embodiments, different PTRS structures are used to develop lower complexity ICI compensation algorithms compared to the baseline Receiver Embodiment 0. In the following transmitter embodiments, a non-limiting example for the case of 3GPP NR is a network node 16 transmitter of the radio interface 62 (downlink) or the transmitter can be a WD 22 transmitter of the radio interface 82 (uplink). Similarly, in the receiver embodiments, the receiver can be a WD 22 receiver of the radio interface 82 (downlink) or the receiver can be a network node 16 receiver of the radio interface 62 (uplink).

Transmitter embodiment 1: Cyclic block PTRS with identical cyclic sequences for all clusters.

FIG. 17 shows an example of a clustered PTRS structure having C clusters (blocks) of M PTRS REs, which are equally spaced across the allocated bandwidth. The cyclic block PTRS is constructed by:

C clusters of size M=4u+1=2 L−1 where L=2u+1 is the ICI filter length.

The block PTRS sequence $\{S_k\}$ of length M=4u+1 has cyclic structure.

In this embodiment, a cyclic block PTRS may be constructed by using an identical cyclic sequence in every cluster to reduce the complexity of ICI compensation algorithm (see Receiver embodiment 1).

As one nonlimiting example embodiment, the following steps may be applied to construct cyclic block PTRS with identical sequence in all clusters. These steps may be performed by radio interface 62, 82 and/or processing circuitry 68, 84, for example.

Step 1: Construct a base sequence with length L=2u+1 with any arbitrary sequences with good correlation properties such as a Chu sequence or a computer generated sequence.

Step 2: Cyclically extend the base sequence to construct the PTRS with length M=4u+1=2 L−1 in all clusters:

Two non-limiting examples of base sequence extension by circular shift are:

Appending a cyclic prefix and a cyclic postfix to the base sequence as shown in FIG. 17.

Appending the last L−1 symbols of the base sequence to the beginning of the base sequence as shown in FIG. 16.

The identical sequence in all clusters reduces the complexity of ICI compensation algorithm (see Receiver embodiment 1) but potentially increases the peak-to-average power ratio (PAPR) and cubic metric (CM).

According to a second teaching of the embodiments, the PTRS sequences in different clusters are cyclic shift versions of each other, where the cyclic shift is performed in the frequency domain. The low-complexity ICI filter estimation in Receiver embodiment 1 can still be applied. However, the cyclic shifts used on different clusters can potentially reduce the peak-to-average power ratio (PAPR).

As one nonlimiting example embodiment:

The PTRS sequence for cluster c is the cK cyclic shifted version of the PTRS sequence of cluster 0, where K is an integer. For example, K=2 or −3 can be applied.

The cyclic shift applied for cluster c is given by $k_c−k_0$ or modulo $(k_c− k_0, M)$ or modulo $((k_c−k_0)K, M)$, where K is an integer.

The cyclic shift applied for cluster c is a function of the resource block (RB) index of the first PTRS sub-carrier in said cluster.

For any of the above example embodiments, the cyclic shifts are also a function of the OFDM symbol index. For any of the above example embodiments, the cyclic shifts are also a function of the WD 22 or cell ID.

According to a $3^{rd}$ teaching of this embodiment, the PTRS sequence in a particular cluster is given by the element-wise product in the frequency domain of the base sequence common to all clusters and a second cluster-specific sequence denoted $r_c(n)$ where c indexes a cluster. The low-complexity ICI filter estimation in Receiver embodiment 1 can still be applied; however, the set of cluster-specific sequences are chosen so as to reduce the peak to average power ratio (PAPR)/(cubic metric) (CM). Two non-limiting examples of a cluster specific sequence are:

A phase ramp sequence of the form $r_c(n)=exp(j\phi_c n)$ where $\phi_c$ is a constant phase step that is a function of the cluster index c; and/or The set of phase steps $\phi_c$ for all clusters is selected so as to minimize the PAPR/CM of the transmitted sequence. where $r_c(n)$ is a pre-determined complex scrambling sequence known to both transmitter and receiver, that is a function of the cluster index c. In one non-limiting example, the pre-determined sequence is a sequence of quadrature phase shift keyed (QPSK) symbols that are generated randomly or pseudo-randomly.

In one non-limiting example, the set of scrambling sequences is selected so as to minimize the PAPR/CM of the transmitted sequence.

For either of the above non-limiting examples, the cluster specific sequence $r_c(n)$ may also be a function of the OFDM symbol index. For either of the above non-limiting examples, the cluster specific sequence $r_c(n)$ may also be a function of the WD 22 or cell ID. For either of the above non-limiting examples, the cluster specific sequence $r_c(n)$ may also be a function of the RB index corresponding to the first PTRS subcarrier in cluster c.

Transmitter embodiment 2: Cyclic block PTRS with different cyclic sequences in different clusters.

In this embodiment, a cyclic block PTRS is constructed by using different cyclic sequences in different clusters to reduce the peak-to-average power ratio (PAPR) and/or the cubic metric (CM).

To construct different cyclic block PTRS sequences in different clusters, the following steps may be applied using a family of Chu or computer generated sequences. These steps may be performed by radio interface 62, 82 and/or processing circuitry 68, 84, for example.

Step 1: A different base sequence in each cluster should be selected. Constant modulus sequences, e.g., Chu sequences, with length L=2u+1 can be chosen as a base sequence. The Chu sequence is formulated as:

$$S(n) = \begin{cases} \exp\left(j\pi\dfrac{p^2}{N}\right), & \text{if } N \text{ is odd,} \\ \exp(j\pi\dfrac{p(p+1)}{N}), & \text{if } N \text{ is even} \end{cases},$$

where gcd (N,p)=1. The cross-correlation between two prime length Chu sequences with $p=p_1$ and $p=p_2$ is constant if $p_1−p_2$ is relatively prim to N.

A nonlimiting approach to construct the block PTRS with different sequences in different clusters is to select Chu-sequence with the same length N=L=2u+1 in all clusters but different p (which can be prime number greater than two) as a base sequence in each cluster.

In a variation of this embodiment, a different base sequence in each cluster can be selected from a pre-defined set of length computer generated (CGS) sequences. In one non-limiting example, the set of CGS sequences are comprised of QPSK symbols, and the sequence set is designed to optimize either or both autocorrelation and mutual cross-correlation properties.

Step 2: Cyclically extend the sequence in each cluster to construct the PTRS with length M=4u+1=2 L−1 in each cluster:

Two non-limiting examples of base sequence extension by circular shift are:

Appending a cyclic prefix and a cyclic postfix to the base sequence as shown in FIG. 17.

Appending the last L−1 symbols of the base sequence to the beginning of the base sequence as shown in FIG. 16.

A low complexity ICI estimation algorithm for the cyclic block PTRS structure with different sequences in different clusters is disclosed in Receiver embodiment 2. The sequence parameters of cluster c are a function of the WD 22 or cell ID. The sequence parameters of cluster c is also a function of cluster index c. The sequence parameters of cluster c is also a function of the RB index of the first PTRS sub-carrier in said cluster. The sequence parameters of cluster c is also a function of the index of the OFDM symbol.

Receiver embodiment 1: Low complexity ICI compensation algorithm exploiting a circulant matrix constructed by an identical sequence in all clusters.

A low complexity ICI compensation algorithm exploiting circulant matrix constructed by an identical sequence in all clusters is disclosed. This algorithm may be performed by radio interface 62, 82 and/or processing circuitry 68, 84, for example. According to one aspect of this embodiment, a cyclic sequence structure on the block PTRS sequence $\{S_k\}$ of length M=4u+1 results in a circulant $(2u+1)\times(2u+1)$ matrix $(S_{u,c})$. If all clusters have an identical sequence, then for all c=0, 1, . . . , C−1:

$$S_{u,c} = S_u \triangleq \begin{bmatrix} S_{k_0+2u} & S_{k_0+2u-1} & \cdots & S_{k_0} \\ S_{k_0} & S_{k_0+2u} & \cdots & S_{k_0+1} \\ \vdots & \vdots & \ddots & \vdots \\ S_{k_0+2u-1} & S_{k_0+2u-2} & \cdots & S_{k_0+2u} \end{bmatrix}$$

The residue sum of squares becomes $$RSS = \sum_{c=0}^{C-1} \|S_u b_u - y_{u,c}\|^2.$$

By setting the first derivative of the RSS with respect to $b_u$ to zero, the solution to this least square problem can be found to be:

$$\hat{b}_u = \left(CS_u^H S_u\right)^{-1} \left(\sum_{c=0}^{C-1} S_u^H y_{u,c}\right).$$

This can be further simplified to $$\hat{b}_u = \frac{1}{C}\left(S_u^H S_u\right)^{-1} S_u^H \sum_{c=0}^{C-1} y_{u,c} = \left(S_u^H S_u\right)^{-1} S_u^H\left(\frac{1}{C}\sum_{c=0}^{C-1} y_{u,c}\right).$$

Let the vector $y_u$ denote the average of all the equalized received PTRS values from all clusters:

$$y_u \triangleq \frac{1}{C}\sum_{c=0}^{C-1} y_{u,c} = \frac{1}{C}\sum_{c=0}^{C-1}\begin{bmatrix} R_{k_c+u}/H_{k_c+u} \\ R_{k_c+u+1}/H_{k_c+u+1} \\ \vdots \\ R_{k_c+M-u-1}/H_{k_c+M-u-1} \end{bmatrix}.$$

The filter can be expressed as:

$$\hat{b}_u = \left(S_u^H S_u\right)^{-1} S_u^H y_u.$$

The proper parameterization choice of the parameter M as M=4u+1 yields a unique solution of $$\hat{b}_u = S_u^{-1} y_u$$

without need of least square (LS) minimization. By exploiting the circulant property of matrix $S_u$ and the circular convolution theorem, the LS solution can be computed using a DFT:

$$\hat{b}_u = \mathrm{IDFT}_L(\mathrm{DFT}_L(y_u) \cdot / \mathrm{DFT}_L(s))$$

where L=2u+1, "·/" denotes element-wise division and s is the last column or row of $S_u$.

For this algorithm, the total MUL complexity with frequency domain filtering is:

$$[12LN_{RB}+C(L+1)]+3L \log L+L.$$

While having identical sequences with cyclic structure in every PTRS cluster potentially reduces the complexity (i.e., total number MUL) of an ICI compensation algorithm, identical sequences may result in high PAPR/CM in the time domain.

Note that, if the PTRS sequences in different clusters are cyclically shifted versions of each other, then there exists reordering of the rows of $S_{u,c}$ and $y_{u,c}$ such that:

row_reordering$_c(S_{u,c})$=$S_u$, for all c=0, 1, . . . , C−1.

With the row reordering, the vector $y_u$ can be defined as $$y_u \triangleq \frac{1}{C}\sum_{c=0}^{C-1} \mathrm{row\_reordering}_c(y_{u,c}).$$

The same solutions in the above for computing $\hat{b}_u$ can then be applied using this new definition of $y_u$.

Receiver embodiment 2: Low complexity ICI compensation algorithm exploiting circulant matrix constructed by a different sequence in each cluster to reduce PAPR.

A low complexity ICI compensation algorithm exploiting circulant matrix constructed by cyclic PTRS sequence if different clusters have different cyclic sequences to reduce PAPR in time domain is disclosed. This algorithm may be performed by radio interface 62, 82 and/or processing circuitry 68, 84, for example. Cyclic PTRS sequences in each cluster are used to compute local estimates $\hat{b}_{u,c}$, which is:

$$\hat{b}_{u,c}=\mathrm{IDFT}_L(\mathrm{DFT}_L(y_{u,c}) \cdot / \mathrm{DFT}_L(s_c))$$

where L=2u+1, "·/" denotes element-wise division and $s_c$ is the last column row of $S_{u,c}$. Using these, a final estimate is obtained by averaging all the local estimates:

$$\hat{b}_u = \frac{1}{C}\sum_{c=0}^{C-1} \hat{b}_{u,c}.$$

If PTRS in each cluster have different cyclic sequences, the total MUL complexity of the algorithm with frequency domain filtering is:

$$[12LN_{RB}+C(L+1)]+(3L \log L+L)C,$$

While having different cyclic sequences for different clusters may increase complexity (i.e., total number MUL) of an ICI compensation algorithm, different cyclic sequences for different clusters may reduce PAPR/CM in the time domain as compared to the PTRS structure with an identical sequence in every PTRS cluster.

According to one aspect, a network node 16 configured to communicate with a wireless device (WD) 22. The network node 16 includes a radio interface 62 and/or processing circuitry 68 configured to generate a phase tracking reference signal, PTRS, having a PTRS sequence that is configured to achieve a specified level of a complexity of an intercarrier interference, ICI, compensation algorithm.

According to this aspect, in some embodiments, the PTRS has a structure that includes identical PTRS sequences for a plurality of clusters. In some embodiments, a low complexity ICI is based at least in part on a circulant matrix constructed by the identical PTRS sequences. In some embodiments, the PTRS has a structure that includes a different PTRS sequence for each of a plurality of clusters. In some embodiments, the PTRS sequences of different clusters are obtained by cyclically shifting a same PTRS sequence. In some embodiments, a low complexity ICI is based at least in part on a circulant matrix constructed by the different PTRS sequences. In some embodiments, a PTRS sequence in a cluster is obtained by an element-wise product in a frequency domain of a base PTRS sequence common to a plurality of clusters and a cluster specific PTRS sequence.

According to another aspect, a method implemented in a network node 16 includes generating a phase tracking reference signal, PTRS, having a PTRS sequence that is configured to achieve a specified level of complexity of an intercarrier interference, ICI, compensation algorithm.

According to this aspect, in some embodiments, the PTRS has a structure that includes identical PTRS sequences for a plurality of clusters. In some embodiments, a low complexity ICI is based at least in part on a circulant matrix constructed by the identical PTRS sequences. In some embodiments, the PTRS has a structure that includes a different PTRS sequence for each of a plurality of clusters. In some embodiments, the PTRS sequences of different clusters are obtained by cyclically shifting a same PTRS sequence. In some embodiments, a low complexity ICI is based at least in part on a circulant matrix constructed by the different PTRS sequences. In some embodiments, a PTRS sequence in a cluster is obtained by an element-wise product in a frequency domain of a base PTRS sequence common to a plurality of clusters and a cluster specific PTRS sequence.

According to yet another aspect, a WD 22 is configured to communicate with a network node 16. The WD 22 includes a radio interface 82 and/or processing circuitry 84 configured to: determine an intercarrier interference, ICI, compensation algorithm based at least in part on a phase tracking reference signal, PTRS having a PTRS sequence; and apply the determined ICI compensation algorithm to compensate for ICI.

According to this aspect, in some embodiments, the PTRS has a structure that includes identical PTRS sequences for a plurality of clusters. In some embodiments, a low complexity ICI is based at least in part on a circulant matrix constructed by the identical PTRS sequences. In some embodiments, the PTRS has a structure that includes a different PTRS sequence for each of a plurality of clusters. In some embodiments, the PTRS sequences of different clusters are obtained by cyclically shifting a same PTRS sequence. In some embodiments, a low complexity ICI is based at least in part on a circulant matrix constructed by the different PTRS sequences. In some embodiments, a PTRS sequence in a cluster is obtained by an element-wise product in a frequency domain of a base PTRS sequence common to a plurality of clusters and a cluster specific PTRS sequence.

According to another aspect, a method implemented in a wireless device (WD) includes determining an intercarrier interference, ICI, compensation algorithm based at least in part on a phase tracking reference signal, PTRS having a PTRS sequence. The method also includes applying the determined ICI compensation algorithm to compensate for ICI.

According to this aspect, in some embodiments, the PTRS has a structure that includes identical PTRS sequences for a plurality of clusters. In some embodiments, a low complexity ICI is based at least in part on a circulant matrix constructed by the identical PTRS sequences. In some embodiments, the PTRS has a structure that includes a different PTRS sequence for each of a plurality of clusters. In some embodiments, the PTRS sequences of different clusters are obtained by cyclically shifting a same PTRS sequence. In some embodiments, a low complexity ICI is based at least in part on a circulant matrix constructed by the different PTRS sequences. In some embodiments, a PTRS sequence in a cluster is obtained by an element-wise product in a frequency domain of a base PTRS sequence common to a plurality of clusters and a cluster specific PTRS sequence.

Some embodiments may include one or more of the following:

Embodiment A1. A network node configured to communicate with a wireless device (WD), the network node configured to, and/or comprising a radio interface and/or comprising processing circuitry configured to:

generate a phase tracking reference signal, PTRS, having a PTRS sequence that is configured to achieve a specified level of a complexity of an intercarrier interference, ICI, compensation algorithm.

Embodiment A2. The network node of Embodiment A1, wherein the PTRS has a structure that includes identical PTRS sequences for a plurality of clusters.

Embodiment A3. The network node of Embodiment A2, wherein a low complexity ICI is based at least in part on a circulant matrix constructed by the identical PTRS sequences.

Embodiment A4. The network node of Embodiment A1, wherein the PTRS has a structure that includes a different PTRS sequence for each of a plurality of clusters.

Embodiment A5. The network node of Embodiment A4, wherein the PTRS sequences of different clusters are obtained by cyclically shifting a same PTRS sequence.

Embodiment A6. The network node of Embodiment A4, wherein a low complexity ICI is based at least in part on a circulant matrix constructed by the different PTRS sequences.

Embodiment A7. The network node of Embodiment A1, wherein a PTRS sequence in a cluster is obtained by an element-wise product in a frequency domain of a base PTRS sequence common to a plurality of clusters and a cluster specific PTRS sequence.

Embodiment B1. A method implemented in a network node, the method comprising:

generating a phase tracking reference signal, PTRS, having a PTRS sequence that is configured to achieve a specified level of complexity of an intercarrier interference, ICI, compensation algorithm.

Embodiment B2. The method of Embodiment B1, wherein the PTRS has a structure that includes identical PTRS sequences for a plurality of clusters.

Embodiment B3. The method of Embodiment B2, wherein a low complexity ICI is based at least in part on a circulant matrix constructed by the identical PTRS sequences.

Embodiment B4. The method of Embodiment B1, wherein the PTRS has a structure that includes a different PTRS sequence for each of a plurality of clusters.

Embodiment B5. The method of Embodiment B4, wherein the PTRS sequences of different clusters are obtained by cyclically shifting a same PTRS sequence.

Embodiment B6. The method of Embodiment B4, wherein a low complexity ICI is based at least in part on a circulant matrix constructed by the different PTRS sequences.

Embodiment B7. The method of Embodiment B1, wherein a PTRS sequence in a cluster is obtained by an element-wise product in a frequency domain of a base PTRS sequence common to a plurality of clusters and a cluster specific PTRS sequence.

Embodiment C1. A wireless device (WD) configured to communicate with a network node, the WD configured to, and/or comprising a radio interface and/or processing circuitry configured to:

determine an intercarrier interference, ICI, compensation algorithm based at least in part on a phase tracking reference signal, PTRS having a PTRS sequence; and
    apply the determined ICI compensation algorithm to compensate for ICI.

Embodiment C2. The WD of Embodiment C1, wherein the PTRS has a structure that includes identical PTRS sequences for a plurality of clusters.

Embodiment C3. The WD of Embodiment C2, wherein a low complexity ICI is based at least in part on a circulant matrix constructed by the identical PTRS sequences.

Embodiment C4. The WD of Embodiment C1, wherein the PTRS has a structure that includes a different PTRS sequence for each of a plurality of clusters.

Embodiment C5. The WD of Embodiment C4, wherein the PTRS sequences of different clusters are obtained by cyclically shifting a same PTRS sequence.

Embodiment C6. The WD of Embodiment C4, wherein a low complexity ICI is based at least in part on a circulant matrix constructed by the different PTRS sequences.

Embodiment C7. The WD of Embodiment C1, wherein a PTRS sequence in a cluster is obtained by an element-wise product in a frequency domain of a base PTRS sequence common to a plurality of clusters and a cluster specific PTRS sequence.

Embodiment D1. A method implemented in a wireless device (WD), the method comprising:

determining an intercarrier interference, ICI, compensation algorithm based at least in part on a phase tracking reference signal, PTRS having a PTRS sequence; and
    applying the determined ICI compensation algorithm to compensate for ICI.

Embodiment D2. The method of Embodiment D1, wherein the PTRS has a structure that includes identical PTRS sequences for a plurality of clusters.

Embodiment D3. The method of Embodiment D2, wherein a low complexity ICI is based at least in part on a circulant matrix constructed by the identical PTRS sequences.

Embodiment D4. The method of Embodiment D1, wherein the PTRS has a structure that includes a different PTRS sequence for each of a plurality of clusters.

Embodiment D5. The method of Embodiment D4, wherein the PTRS sequences of different clusters are obtained by cyclically shifting a same PTRS sequence.

Embodiment D6. The method of Embodiment D4, wherein a low complexity ICI is based at least in part on a circulant matrix constructed by the different PTRS sequences.

Embodiment D7. The method of Embodiment D1, wherein a PTRS sequence in a cluster is obtained by an element-wise product in a frequency domain of a base PTRS sequence common to a plurality of clusters and a cluster specific PTRS sequence.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

BWP Bandwidth part
CSI Channel-state information
CSI-RS CSI reference signal
CM Cubic metric
CP Cyclic Prefix
CPE Common phase error
DCI Downlink control information
DM-RS Demodulation reference signal
FR1 Frequency range 1 as defined in [8, TS 38.104]
FR2 Frequency range 2 as defined in [8, TS 38.104]
ICI inter-carrier interference
NR New radio
NR-RS NR reference signal
PDCCH Physical downlink control channel
PDSCH Physical downlink shared channel
PN Phase noise
PRB Physical resource block
PSD Power spectral density
PTRS Phase tracking reference signal
PUCCH Physical uplink control channel
PUSCH Physical uplink shared channel
RS Reference signal
TB Transport Blocks It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a transmitter of one of a network node and a wireless device (WD), the method comprising:
   determining, for a receiver, a cyclic block phase tracking reference signal (PTRS) sequence by cyclically extending a base sequence;
   performing, based at least in part on the PTRS sequence, an inter-carrier interference (ICI) compensation algorithm of a specified level of complexity; and
   transmitting the PTRS.

2. The method of claim 1, wherein determining the PTRS includes determining a different PTRS for each of a plurality of clusters.

3. The method of claim 2, wherein the PTRS for each cluster is based at least in part on cyclically shifting the PTRS of a first cluster of the plurality of clusters.

4. The method of claim 3, wherein cyclically shifting the PTRS includes shifting by an amount that is based at least in part on at least one of a resource block index, an orthogonal frequency division multiplex (OFDM) symbol index, a WD identification and a cell identification.

5. The method of claim 2, wherein a PTRS for a cluster is determined based at least in part on an element-wise product in the frequency domain of a base sequence common to all of the plurality of clusters and a cluster-specific sequence.

6. The method of claim 5, wherein the cluster-specific sequence is based at least in part on a complex exponential of a phase step times an index.

7. The method of claim 5, wherein the cluster-specific sequence is based at least in part on a scrambling sequence.

8. The method of claim 7, wherein the scrambling sequence is selected to minimize a peak to average power ratio of the transmitted PTRS.

9. The method of claim 1, wherein cyclically extending the base sequence includes appending a cyclic prefix and a cyclic postfix to the base sequence.

10. The method of claim 1, wherein cyclically extending the base sequence includes appending a last L−1 symbols of the base sequence to a beginning of the base sequence, L being a filter length of the ICI compensation algorithm.

11. A transmitter for one of a network node and a wireless device (WD), the transmitter comprising:
   processing circuitry configured to:
      determine, for a receiver, a cyclic block phase tracking reference signal, (PTRS) sequence by cyclically extending a base sequence; and
      perform, based at least in part on the PTRS sequence, an inter-carrier interference (ICI) compensation algorithm of a specified level of complexity; and
   a radio interface in communication with the processing circuitry and configured to transmit the PTRS.

12. The transmitter of claim 11, wherein determining the PTRS includes determining a different PTRS for each of a plurality of clusters.

13. A method in a receiver of one of a network node and a wireless device, WD, the method comprising:
   receiving a phase tracking reference signal (PTRS), having a PTRS sequence;
   determining intercarrier interference (ICI) compensation filter coefficients based at least in part on a circulant matrix of known PTRS sequences, a PTRS sequence being formed by cyclically extending a base sequence; and
   applying a filter having the determined ICI compensation filter coefficients to the received PTRS sequence.

14. The method of claim 13, wherein determining a set of ICI filter coefficients is further based in part on a channel equalization applied to the received PTRS.

15. The method of claim 13, wherein the received PTRS includes a plurality of PTRS sequences, each PTRS sequence corresponding to a different cluster.

16. The method of claim 13, wherein determining the ICI filter coefficients includes determining a vector of ICI filter coefficients that minimizes a residue sum of squares of terms involving the circulant matrix times an ICI filter coefficient vector minus an equalized received PTRS vector.

17. The method of claim 16, wherein determining the vector of ICI filter coefficients that minimizes the residue sum of squares includes multiplying the circulant matrix by a Hermitian transpose of the circulant matrix.

18. The method of claim 13, wherein determining the ICI filter coefficients includes multiplying an equalized received PTRS vector by an inverse of the circulant matrix.

19. A receiver for one of a network node and a wireless device (WD), the receiver comprising:

a radio interface configured to receive a phase tracking reference signal (PTRS), and processing circuitry in communication with the radio interface and configured to:

determine intercarrier interference (ICI) compensation filter coefficients based at least in part on a circulant matrix of known phase tracking reference signal (PTRS) sequences, a PTRS sequence being formed by cyclically extending a base sequence; and apply a filter having the determined ICI compensation filter coefficients to a received PTRS sequence.

20. The receiver of claim 19, wherein determining a set of ICI filter coefficients is further based in part on a channel equalization applied to the received PTRS.

* * * * *